(12) United States Patent
Takai et al.

(10) Patent No.: US 11,990,759 B2
(45) Date of Patent: May 21, 2024

(54) POWER MANAGEMENT SYSTEM

(71) Applicant: IHI Corporation, Tokyo (JP)

(72) Inventors: Norihiro Takai, Tokyo (JP); Akira Takami, Tokyo (JP); Masato Kotake, Tokyo (JP); Seiichi Nakajima, Tokyo (JP)

(73) Assignee: IHI CORPORATION, Tokyo (JP)

( * ) Notice: Subject to any disclaimer, the term of this patent is extended or adjusted under 35 U.S.C. 154(b) by 454 days.

(21) Appl. No.: 17/600,297

(22) PCT Filed: Mar. 30, 2020

(86) PCT No.: PCT/JP2020/014654
§ 371 (c)(1),
(2) Date: Sep. 30, 2021

(87) PCT Pub. No.: WO2020/203993
PCT Pub. Date: Oct. 8, 2020

(65) Prior Publication Data
US 2022/0209539 A1    Jun. 30, 2022

(30) Foreign Application Priority Data

Apr. 3, 2019  (JP) .................................. 2019-071279
Apr. 3, 2019  (JP) .................................. 2019-071281
(Continued)

(51) Int. Cl.
*H02J 3/38*    (2006.01)
*G05B 13/02*   (2006.01)
(Continued)

(52) U.S. Cl.
CPC ............ *H02J 3/381* (2013.01); *G05B 13/021* (2013.01); *H02J 3/004* (2020.01); *H02J 3/28* (2013.01); *H02J 2300/24* (2020.01)

(58) Field of Classification Search
CPC .... H02J 3/381; H02J 3/004; H02J 3/28; H02J 15/008; H02J 7/35; Y02E 10/56
See application file for complete search history.

(56) References Cited

U.S. PATENT DOCUMENTS 9,638,545 B2    5/2017  Furukawa et al.
2011/0137482 A1  6/2011  Toba et al.
(Continued)

FOREIGN PATENT DOCUMENTS

AU    2017239489 A1    5/2018
CN    103475030 A      12/2013
(Continued)

OTHER PUBLICATIONS

Ji et al., "Coordinated control and power management of diesel-PV-battery in hybrid stand-alone microgrid system", Journal, Institute of Engineering & Technology, Zhenjiang, People's Republic of China (2019).

(Continued)

*Primary Examiner* — Mohammad Ali
*Assistant Examiner* — Dhruvkumar Patel
(74) *Attorney, Agent, or Firm* — Volpe Koenig

(57) ABSTRACT

An electric power management system includes a solar radiation amount measurement device that measures a solar radiation amount received by the solar power generation device, and a control device that outputs a control command including a command for the load facility. The control device includes a pre-processing unit that outputs information used to generate the control command, and a command generation unit that outputs the control command, on the basis of the information output by the pre-processing unit. The pre-processing unit includes a prediction unit that outputs electric power expected to be output by the electric power generation facility as estimated generation electric (Continued)

power, on the basis of the solar radiation amount. The command generation unit includes a load command unit that outputs the control command including a command for increasing and decreasing the load electric power to the load facility, on the basis of the estimated generation electric power.

12 Claims, 8 Drawing Sheets

(30) Foreign Application Priority Data

Apr. 3, 2019  (JP) .................................. 2019-071282
Apr. 3, 2019  (JP) .................................. 2019-071285

(51) Int. Cl.
*H02J 3/00* (2006.01)
*H02J 3/28* (2006.01)

(56) References Cited

U.S. PATENT DOCUMENTS

| | | |
|---|---|---|
| 2012/0235478 A1 | 9/2012 | Hayashida |
| 2013/0024034 A1 | 1/2013 | Iino et al. |
| 2013/0313902 A1 | 11/2013 | Sako et al. |
| 2014/0200723 A1 | 7/2014 | Roy et al. |
| 2016/0313716 A1 | 10/2016 | Chen et al. |
| 2017/0187191 A1 | 6/2017 | Kojima et al. |
| 2019/0052085 A1 * | 2/2019 | Kuboyama ............... H02J 7/35 |
| 2021/0075216 A1 | 3/2021 | Matsuo et al. |

FOREIGN PATENT DOCUMENTS

| | | |
|---|---|---|
| CN | 111555366 A | 8/2020 |
| JP | 2004-180467 A | 6/2004 |
| JP | 2006-296097 A | 10/2006 |
| JP | 2008-125295 A | 5/2008 |
| JP | 2008-154334 A | 7/2008 |
| JP | 2013-027285 A | 2/2013 |
| JP | 2013-192277 A | 9/2013 |
| JP | 2014-045636 A | 3/2014 |
| JP | 2014-168328 A | 9/2014 |
| JP | 2015-056942 A | 3/2015 |
| JP | 2016-019430 A | 2/2016 |
| JP | 2016-144229 A | 8/2016 |
| JP | 2016-226120 A | 12/2016 |
| JP | 2017-046388 A | 3/2017 |
| JP | 2017-099148 A | 6/2017 |
| JP | 2017-163795 A | 9/2017 |
| JP | 2017-169349 A | 9/2017 |
| JP | 2017163795 A * | 9/2017 |
| JP | 2017169349 A * | 9/2017 |
| JP | 2018-064423 A | 4/2018 |
| JP | 6414870 B1 | 10/2018 |
| JP | 2019-030151 A | 2/2019 |
| JP | 2019-033562 A | 2/2019 |
| WO | 2012/090365 A1 | 7/2012 |
| WO | 2014/057867 A1 | 4/2014 |
| WO | WO-2014057867 A1 * | 4/2014 ............... G05F 1/67 |
| WO | 2017/179178 A1 | 10/2017 |

OTHER PUBLICATIONS

IHI Plant Services Corporation, "Photovoltaic power plant that we can recommend as a corporation involving power generation business," IHI Technical Report, vol. 55, No. 4 (2015), pp. 42-45.

Hirose, K,. et al., "PV Output Power Smoothing System using the Battery," Aichi Electric Technical Report, No. 36 (2015), pp. 24-29.

Nanahara, T., "Effect of smoothing photovoltaic power output fluctuation," Report prepared by Central Research Institute of Electric Power Industry, 2005.

* cited by examiner

POWER MANAGEMENT SYSTEM

TECHNICAL FIELD

The present disclosure relates to an electric power management system.

BACKGROUND ART

Patent Literatures 1 to 3 disclose an electric power management system. Such systems include an electric power generation facility including a solar power generation panel, and an electricity storage battery. For example, a control unit of the system of Patent Literature 1 controls charge electric power supplied to the electricity storage battery and generation electric power of the solar power generation panel, on the basis of purchased electric power from an electric power grid. As a result thereof, a reverse electric power flow to the electric power grid can be suppressed.

CITATION LIST

Patent Literature

Patent Literature 1: International Publication WO 2017/179178
Patent Literature 2: Japanese Unexamined Patent Publication No. 2008-154334
Patent Literature 3: Japanese Unexamined Patent Publication No. 2004-180467

SUMMARY OF INVENTION

Technical Problem

Recently, a technology relevant to a so-called microgrid has been studied. The microgrid includes a power source, a consumer, and an electric power grid connecting the power source and the consumer. In the microgrid, the demand of the consumer is covered by the supply of the power source. Accordingly, in the microgrid, the purchase and the supply of electric power from the electric power grid are not essential.

On the other hand, the microgrid may be connected to the electric power grid, in accordance with the operation mode. Electric power generated in the microgrid may be supplied to the electric power grid (a reverse electric power flow), and insufficient electric power in the microgrid may be received from the electric power grid. In such a configuration, in a case where generation electric power is excessively greater than load electric power, the reverse electric power flow that is not planned may be generated. The reverse electric power flow to the electric power grid affects a balance between the demand and the supply in the electric power grid. Accordingly, it is necessary that the reverse electric power flow to the electric power grid is strictly managed.

Examples of the power source included in the microgrid include a solar power generation facility. A solar power generation device is easily affected by the ambient environment such as the weather. That is, generation electric power may be increased and decreased due to the influence of the ambient environment. In such a circumstance, it is required to maintain a balance between the generation electric power and the load electric power in the microgrid.

The present disclosure describes an electric power management system that is capable of managing a balance between generation electric power and load electric power in a desired manner.

Solution to Problem

An electric power management system of the present disclosure is an electric power management system adjusting actual generation electric power output by an electric power generation facility including a solar power generation device, and load electric power consumed by a load facility that is connected to the electric power generation facility, the electric power management system including a solar radiation amount measurement device that is provided adjacent to the solar power generation device and measures a solar radiation amount received by the solar power generation device, and a control device that outputs a control command including a command for the load facility. The control device includes a pre-processing unit that outputs information used to generate the control command, and a command generation unit that outputs the control command, on the basis of the information output by the pre-processing unit. The pre-processing unit includes a prediction unit that outputs electric power expected to be output by the electric power generation facility as estimated generation electric power, on the basis of the solar radiation amount. The command generation unit includes a load command unit that outputs the control command including a command for increasing and decreasing the load electric power to the load facility, on the basis of the estimated generation electric power.

Effects of Invention

According to an electric power management system of the present disclosure, a balance between generation electric power and load electric power can be managed in a desired manner.

DESCRIPTION OF EMBODIMENTS

Figure 1:
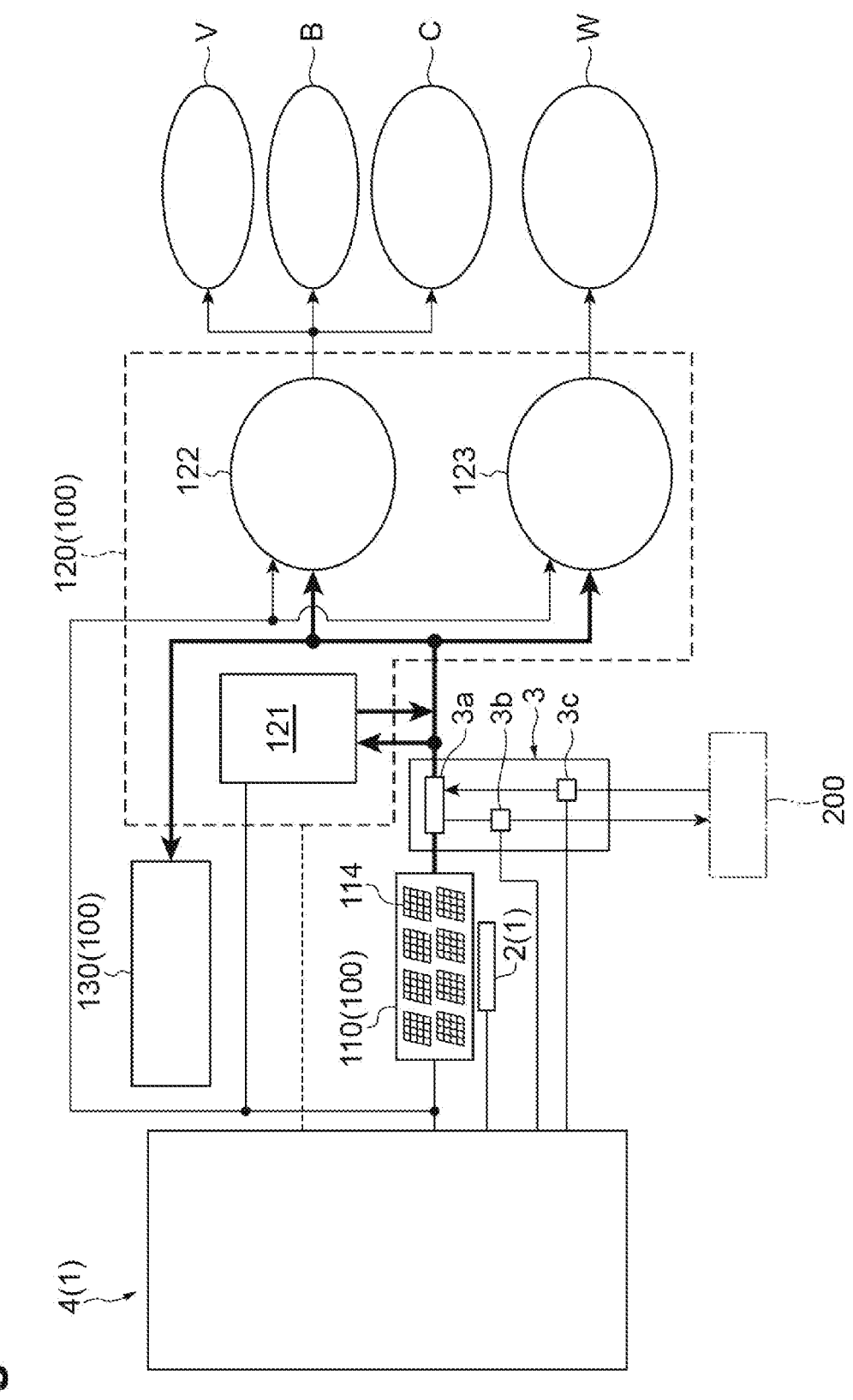
FIG. 1 is a schematic view of an electric power management system of an embodiment.

An electric power management system of the present disclosure is an electric power management system adjusting actual generation electric power output by an electric power generation facility including a solar power generation device, and load electric power consumed by a load facility that is connected to the electric power generation facility, the electric power management system including a solar radiation amount measurement device that is provided adjacent to the solar power generation device and measures a solar radiation amount received by the solar power generation device, and a control device that outputs control command including a command for the load facility. The control device includes a pre-processing unit that outputs information used to generate the control command, and a command generation unit that outputs the control command, on the basis of the information output by the pre-processing unit. The pre-processing unit includes a prediction unit that outputs electric power expected to be output by the electric power generation facility as estimated generation electric power, on the basis of the solar radiation amount. The command generation unit includes a load command unit that outputs the control command including a command for increasing and decreasing the load electric power to the load facility, on the basis of the estimated generation electric power.

In such an electric power management system, the prediction unit of the control device outputs the electric power expected to be output by the electric power generation facility as the estimated generation electric power, on the basis of the solar radiation amount that is measured by the solar radiation amount measurement device. The command generation unit of the control device generates the control command that is provided to the load facility, on the basis of the estimated generation electric power. As a result thereof, a balance between the generation electric power of the electric power generation facility and the load electric power of the load facility can be managed in a desired manner.

The load command unit of the control device of the electric power management system may output the control command including a command for setting the load electric power to be greater than or equal to the estimated generation electric power to the load facility. According to such a configuration, the flow of electric power to an electric power grid (a reverse electric power flow) can be reliably suppressed.

The load command unit of the electric power management system may output the control command including a command for setting the load electric power to be less than the estimated generation electric power to the load facility. According to such a configuration, the flow of the electric power to the electric power grid can be controlled in a desired manner.

The electric power management system may include an electric power grid connection device that connects the electric power generation facility and the load facility to an electric power grid and measures reverse flow electric power flowing to the electric power grid. The load command unit may output the control command, on the basis of the reverse flow electric power and a reverse electric power flow threshold value. According to such a configuration, the generation of the flow of the electric power to the electric power grid (the reverse electric power flow) can be suppressed.

The reverse electric power flow threshold value in the electric power management system may be set in accordance with a value obtained by dividing the actual generation electric power by the number of solar power generation devices being operated in the electric power generation facility. According to such setting, the threshold value is set in accordance with generation electric power per one solar power generation device. Accordingly, electric power that is capable of increasing purchased electric power is determined by stopping only one solar power generation device. As a result thereof, a margin can be cut, and the threshold value can be decreased.

The load facility of the electric power management system may include at least one of a hydrogen production device that produces hydrogen by using the actual generation electric power and a heat generation device that generates heat by using the actual generation electric power. The control command may include at least one of a command for adjusting a production amount of the hydrogen and a command for adjusting a generation amount of the heat. Accordingly, the balance between the actual generation electric power and the load electric power can be accurately maintained by increasing and decreasing at least one of the production amount of the hydrogen and the generation amount of the heat.

The electric power management system may include an electric power grid connection device that connects the electric power generation facility and the load facility to an electric power grid and measures purchased electric power flowing from the electric power grid. The command generation unit may include a number command unit that outputs the control command, on the basis of the purchased electric power. The number command unit may output the control command including a command for determining the number of solar power generation devices in an operation state to the electric power generation facility, on the basis of the purchased electric power. According to such a configuration, the reverse electric power flow to the electric power grid can be reliably suppressed.

The pre-processing unit of the electric power management system may include a coefficient unit that outputs a coefficient which is a value obtained by dividing the number of all solar power generation devices included in the electric power generation facility by the number of solar power generation devices being operated, a correction unit that outputs corrected generation electric power that is the actual generation electric power corrected by multiplying the actual generation electric power by the coefficient, an evaluation unit that outputs evaluation electric power for evaluating the corrected generation electric power in a predetermined period, and an evaluation difference unit that outputs an evaluation difference which is a difference between the corrected generation electric power and the evaluation electric power. Accordingly, the corrected generation electric power can be calculated in consideration of the number of solar power generation devices that output the generation electric power. As a result thereof, the balance between the generation electric power and the load electric power can be more excellently maintained.

In the above description, the evaluation electric power may be a moving average value of the corrected generation electric power in the predetermined period.

In the above description, the load facility may include an electricity storage device. The command generation unit of the electric power management system may include an evaluation command unit that outputs the control command, on the basis of the evaluation difference. The evaluation command unit may output the control command including a command for charging the electricity storage device to the electricity storage device in a case where the evaluation difference indicates that the corrected generation electric power is greater than the evaluation electric power, or may output the control command including a command for discharging the electricity storage device to the electricity storage device in a case where the evaluation difference indicates that the corrected generation electric power is less than the evaluation electric power. Accordingly, the smoothing of the actual generation electric power can be attained by the charge and discharge of the electricity storage device. Accordingly, the balance between the generation electric power and the load electric power can be reliably maintained.

In the above description, the load facility may include an electricity storage device. The electric power management system may include an electric power grid connection device that connects the electric power generation facility and the load facility to an electric power grid and measures purchased electric power flowing from the electric power grid. The command generation unit may include an electricity storage command unit that outputs the control command, on the basis of the purchased electric power. The electricity storage command unit may output a first electricity storage command to the electricity storage device in a case where the purchased electric power is less than a charge threshold value, or may output a second electricity storage command to the electricity storage device in a case where the purchased electric power is greater than a discharge threshold value. The first electricity storage command may be a command for performing a charge operation with respect to the electricity storage device at a first charge rate, and then, for performing a charge operation with respect to the electricity storage device at a second charge rate that is slower than the first charge rate. The second electricity storage command may be a command for performing a discharge operation with respect to the electricity storage device at a first discharge rate, and then, for performing a discharge operation with respect to the electricity storage device at a second discharge rate that is slower than the first discharge rate. According to such a configuration, the purchased electric power can be suitably controlled.

The electric power management system may include an electric power grid connection device that connects the electric power generation facility and the load facility to an electric power grid and measures purchased electric power flowing from the electric power grid. The command generation unit may include a capacity command unit that outputs the control command, on the basis of the purchased electric power. The capacity command unit may output the control command including a command for performing an output operation with respect to the electric power generation facility at a first output rate, and then, for performing an output operation with respect to the electric power generation facility at a second output rate that is slower than the first output rate to the electric power generation facility in a case where the purchased electric power is less than a capacity threshold value. Also, according to such a configuration, the purchased electric power can be suitably controlled.

The capacity command unit of the electric power management system may output the control command including a command for outputting the entire electric power generated by the solar power generation device as the actual generation electric power to the electric power generation facility in a case where the purchased electric power is greater than the capacity threshold value. Accordingly, the actual generation electric power of the electric power generation facility can be maximized without frequently re-operating the solar power generation device of the electric power generation facility.

Hereinafter, a mode for carrying out the electric power management system of the present disclosure will be described in detail, with reference to the attached drawings. In the description of the drawings, the same reference numerals will be applied to the same constituents, and the repeated description will be omitted.

<Microgrid>

As illustrated in FIG. 1, an electric power management system 1 is used in a microgrid 100. The microgrid 100 includes an electric power generation facility 110, a load facility 120, a consumer 130, and an electric power distribution grid connecting the facilities and the consumer. In the microgrid 100, electric power output by the electric power generation facility 110 is consumed by the load facility 120 and the consumer 130. In the following description, such a relationship between the supply and the demand of the electric power will be referred to as so-called "local production for local consumption". The electric power management system 1 controls generation electric power of the electric power generation facility 110 and load electric power of the load facility 120.

Ideally, the microgrid 100 is operated such that the generation electric power generated by the electric power generation facility 110 is identical to the load electric power of the load facility 120 and the consumer 130. That is, the electric power management system 1 adjusts the generation electric power and the load electric power. Basically, the electric power management system 1 adjusts the generation electric power and the load electric power such that the generation electric power is not greater than the load electric power.

The microgrid 100 may be connected to an electric power grid 200, as necessary. In such a case, insufficient electric power can be received from the electric power grid 200. On the other hand, the flow of electric power to the electric power grid 200 from the microgrid 100 (a so-called reverse electric power flow) affects a balance between the demand and the supply of the electric power in the electric power grid 200. Accordingly, basically, the electric power management system 1 does not generate the reverse electric power flow.

The microgrid 100 may flexibly change the operation mode. In the microgrid 100, the entire electric power to be requested may be covered by the electric power generation facility 110, or a part of the electric power to be requested may be received from the electric power grid 200. In the microgrid 100, the entire generated electric power may be consumed by the load facility 120 and the consumer 130, or a part of the generated electric power may be supplied to the electric power grid 200 as the reverse electric power flow.

Figure 2:
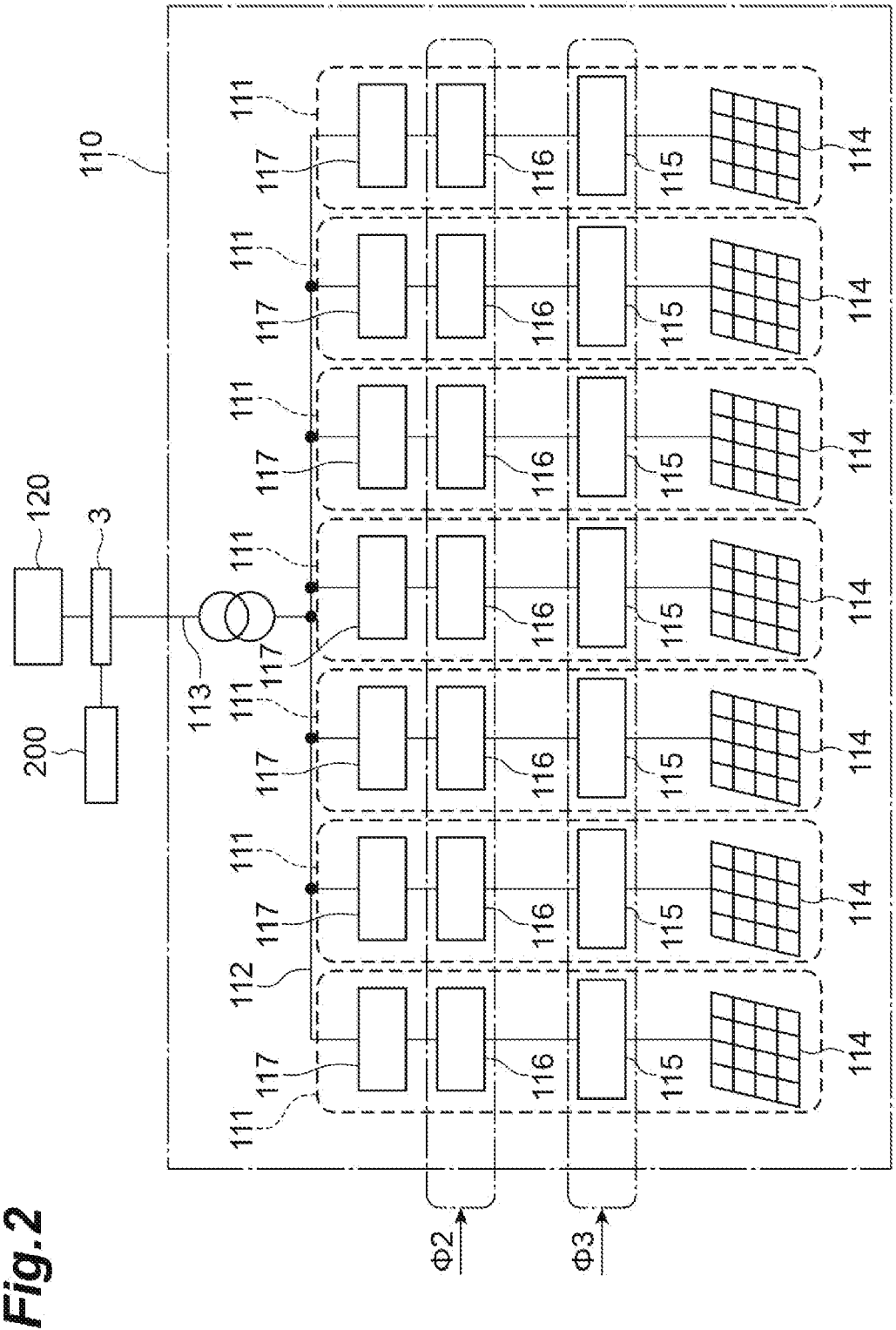
FIG. 2 is a schematic view of an electric power generation facility of FIG. 1.

As illustrated in FIG. 2, the electric power generation facility 110 which is a power source includes a plurality of electric power generation units 111 (solar power generation devices), a connection line 112, and an output line 113. The electric power generation facility 110, for example, includes the plurality of electric power generation units 111. Each output end of the electric power generation units 111 is connected to the connection line 112. An input end of the output line 113 is also connected to the connection line 112. Accordingly, generation electric power of the electric power generation unit 111 is transferred to the input end of the output line 113 through the connection line 112, and is output to the electric power distribution grid from an output end of the electric power generation facility 110. The electric power generation facility 110 transmits information relevant to the electric power that is being output (hereinafter, "actual generation electric power θ1"), and information relevant to the number of electric power generation panels 114 outputting the electric power (hereinafter the "number θ2 of panels being operated") to the electric power management system 1.

The electric power generation unit 111 includes an electric power generation panel 114, a power conditioner 115, an electromagnetic switch 116, and a wiring breaker 117.

The electric power generation panel 114 outputs electric power that is generated by receiving solar light to the power conditioner 115.

The power conditioner 115 is connected to the output of the electric power generation panel 114 and the input of the electromagnetic switch 116. The power conditioner 115 receives direct-current electric power from the electric power generation panel 114. The power conditioner 115 converts the direct-current electric power into desired alternating-current electric power. Then, the power conditioner 115 outputs the alternating-current electric power to the electromagnetic switch 116.

The electromagnetic switch 116 is connected to the output of the power conditioner 115 and the input of the wiring breaker 117. The electromagnetic switch 116 controls the provision and the stop of the electric power with respect to the wiring breaker 117 from the power conditioner 115 by using an electromagnetic contactor (MC). Such control of the provision and the stop of the electric power is based on a control command (a number command φ2) of the electric power management system 1. In other words, the electromagnetic switch 116 controls whether or not to provide the electric power generated by the electric power generation panel 114 to a load side. For example, when the electric power is supplied to the load side, the electromagnetic switch 116 is in an off state. On the other hand, when the electric power is not supplied to the load side, the electromagnetic switch 116 is in an on state. For example, in a case where output electric power of the electric power generation facility 110 is increased, the number of electromagnetic switches 116 in the off state is increased. On the other hand, in a case where the output electric power of the electric power generation facility 110 is decreased, the number of electromagnetic switches 116 in the off state is decreased.

The wiring breakers 117 (molded case circuit breakers; MCCB) are connected to a plurality of electromagnetic switches 116, respectively. In a case where an excess electric current is generated in the electric power distribution grid of the load facility 120 and the consumer 130 on the load side, the wiring breaker 117 which is a so-called breaker blocks electric power supply from the electric power generation panel 114.

Referring again to FIG. 1, the load facility 120 is connected to the electric power generation facility 110. The load facility 120 performs a desired operation by using electric power received from the electric power generation facility 110. The load facility 120 transmits information indicating the load electric power (hereinafter, "load electric power θ3") to the electric power management system 1. Information relevant to the load electric power of the consumer 130 is transmitted to the electric power management system 1 as load electric power θ4. The load facility 120 includes an electricity storage device 121, a hydrogen production device 122, and a heat generation device 123.

The electricity storage device 121 is connected to the electric power generation facility 110. The electricity storage device 121 charges and discharges the electric power generated by the electric power generation facility 110. The electricity storage device 121 receives a control command (an electricity storage command φ4 and an evaluation command φ5) of the electric power management system 1, and performs charge and discharge by the control command. The electricity storage device 121, for example, is a stationary electricity storage device. The electricity storage device 121, for example, is a lithium-ion battery (LiB).

The hydrogen production device 122 produces hydrogen by the electric power generated by the electric power generation facility 110. The hydrogen production device 122, for example, includes a water-electrolysis device that produces hydrogen by electrolyzing water, and a preservation device that preserves the produced hydrogen. The hydrogen production device 122 receives a control command (a load command φ1) of the electric power management system 1, and increases and decreases a production amount of the hydrogen by the control command. The hydrogen produced by the hydrogen production device 122, for example, is supplied to a fuel cell vehicle V, a fuel cell electric power generation device B, or the like. The hydrogen produced by the hydrogen production device 122, for example, may be converted and preserved in other energy carriers C.

The heat generation device 123 generates heat by the electric power generated by the electric power generation facility 110. The heat generation device 123, for example, is an electric boiler. The heat generation device 123, for example, generates moisture vapor by heating water. The heat generation device 123 receives the control command (the load command φ1) of the electric power management system 1, and increases and decreases a generation amount of the heat by the control command. The moisture vapor generated by the heat generation device 123, for example, is supplied to a drying facility W as heat. The moisture vapor generated by the heat generation device 123 may be supplied to a biofuel production device or the like.

As described above, the load facility 120 converts the energy of the electric power generated by the electric power generation facility 110 by the electricity storage device 121, the hydrogen production device 122, and the heat generation device 123, and preserves and supplies the converted energy.

<Electric Power Management System>

The electric power management system 1 includes a solar radiation amount measurement device 2, an electric power grid connection device 3, and a control device 4.

The solar radiation amount measurement device 2 is provided adjacent to the electric power generation panel 114. The solar radiation amount measurement device 2 measures a solar radiation amount applied to the electric power generation panel 114. The solar radiation amount measurement device 2, for example, is a pyranometer that converts the solar radiation amount into an electric command by using a thermoelectric element or a photoelectric element. The solar radiation amount measurement device 2, for example, continuously measures the solar radiation amount. The solar radiation amount measurement device 2 transmits data indicating the solar radiation amount (hereinafter, a "solar radiation amount θ5") to the control device 4. One solar radiation amount measurement device 2 may be provided with respect to a plurality of electric power generation panels 114, or the solar radiation amount measurement device 2 may be provided for each of the electric power generation panels 114.

The electric power grid connection device 3 is an interface with respect to the electric power grid 200. The electric power grid connection device 3 is provided in an electric power transmission line between the electric power generation facility 110 and the load facility 120. The electric power grid connection device 3 receives the provision of the electric power from the electric power grid 200 and allows the electric power to flow to the electric power grid 200. The electric power grid connection device 3 includes a connection unit 3a, a reverse electric power flow measurement unit 3b, and a purchased electric power measurement unit 3c.

The connection unit 3a is provided in the electric power transmission line between the electric power generation facility 110 and the load facility 120. The connection unit 3a includes an input end that receives the electric power from the electric power generation facility 110, an input end that receives the electric power from the electric power grid 200, an output end that outputs the electric power to the load facility 120, and an output end that outputs the electric power to the electric power grid 200.

The reverse electric power flow measurement unit 3b is connected to the output end that outputs the electric power to the electric power grid 200. The reverse electric power flow measurement unit 3b measures the electric power of the reverse electric power flow to the electric power grid 200 from the electric power generation facility 110. The reverse electric power flow measurement unit 3b continuously measures the electric power of the reverse electric power flow. The reverse electric power flow measurement unit 3b transmits data of the electric power of the reverse electric power flow (hereinafter, "reverse flow electric power $\theta6$") to the control device 4. The reverse electric power flow measurement unit 3b, for example, is an electric power meter.

The purchased electric power measurement unit 3c is connected to the input end that receives the electric power from the electric power grid 200. The purchased electric power measurement unit 3c measures the purchased electric power from the electric power grid 200. The purchased electric power measurement unit 3c continuously measures the purchased electric power. The purchased electric power measurement unit 3c transmits data of the purchased electric power (hereinafter, "purchased electric power $\theta7$") to the control device 4. The purchased electric power measurement unit 3c, for example, is an electric power meter.

The control device 4, for example, is a computer including hardware such as a central processing unit (CPU), a read only memory (ROM), and a random access memory (RAM), and software such as a program stored in the ROM. The control device 4 generates a control command for controlling the electric power generation facility 110 and the load facility 120.

Figure 3:
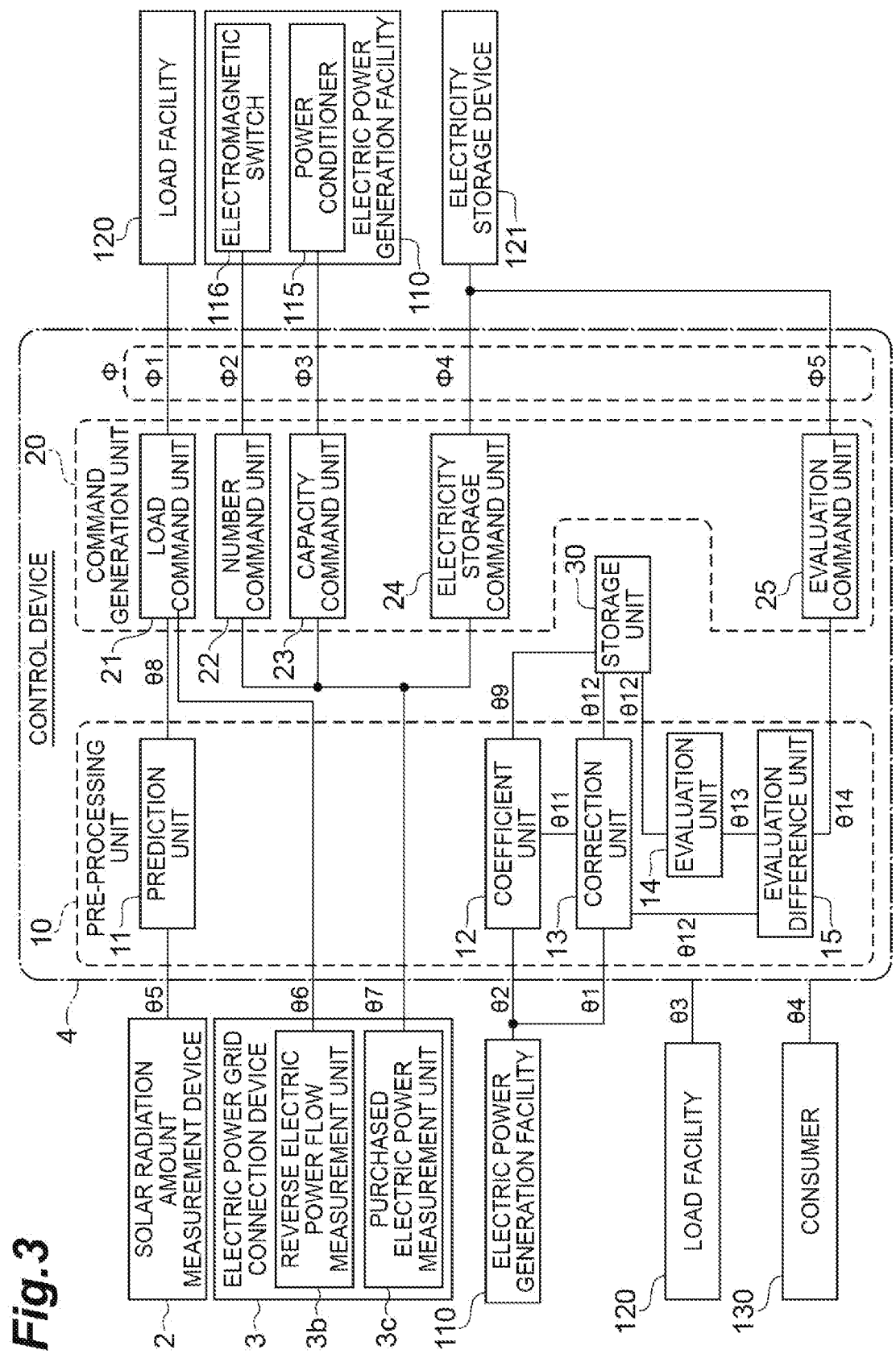
FIG. 3 is a block diagram illustrating a power source management system of the embodiment.

As illustrated in FIG. 3, the control device 4 includes a pre-processing unit 10, a command generation unit 20, and a storage unit 30, as a functional constituent. The pre-processing unit 10 acquires necessary raw data from the devices or the facilities constituting the microgrid 100. Next, the pre-processing unit 10 performs desired arithmetic processing with respect to the raw data, and generates processing data. Then, the pre-processing unit 10 outputs the processing data to the command generation unit 20. The command generation unit 20 generates a control command for the devices or the facilities constituting the microgrid 100 by using the processing data. Then, the command generation unit 20 outputs the control command to each of the devices and the facilities.

The pre-processing unit 10 includes a prediction unit 11, a coefficient unit 12, a correction unit 13, an evaluation unit 14, and an evaluation difference unit 15.

The prediction unit 11 receives the solar radiation amount $\theta5$ from the solar radiation amount measurement device 2. The prediction unit 11 outputs electric power expected to be output by the electric power generation facility 110 as estimated generation electric power $\theta8$, on the basis of the solar radiation amount $\theta5$. Then, the prediction unit 11 outputs the estimated generation electric power $\theta8$ to the command generation unit 20. The prediction unit 11 obtains the estimated generation electric power $\theta8$, on the basis of the solar radiation amount $\theta5$ and the atmospheric temperature. The prediction unit 11 may correct the estimated generation electric power $\theta8$ by using a solar radiation intensity coefficient relevant to an incident angle of solar light or a temperature correction coefficient relevant to the atmospheric temperature. The solar radiation intensity coefficient and the temperature correction coefficient can be set as necessary.

In a distributed electric power generation facility 110 controlling the generation of the reverse electric power flow, the degree of excessive electric power is not capable of being determined by only monitoring the actual generation electric power. This is because the actual generation electric power $\theta1$ of the electric power generation facility 110 is controlled by using a threshold value for preventing the reverse electric power flow (a reverse electric power flow threshold value). Therefore, the maximum capacity of the generation electric power at the time of measuring the solar radiation amount $\theta5$ is calculated as an electric power generation capacity index (the estimated generation electric power $\theta8$) by using the solar radiation amount $\theta5$, the specification value of the electric power generation panel 114, and the atmospheric temperature. The "control of local production for local consumption" with respect to the electric power generation facility 110 can be attained by setting a control command $\phi$ with respect to the load facility 120 with the estimated generation electric power $\theta8$ as an index. For example, the output of the general solar panel is defined by a module temperature, an incident angle, and solar radiation intensity. Accordingly, in a case where the atmospheric temperature and the solar radiation intensity (the solar radiation amount $\theta5$) at the time of measuring the solar radiation amount $\theta5$ are known, electric power generation capacity can be simply calculated. In the calculation of the electric power generation capacity, the incident angle correction of the solar light and correction based on a panel temperature may be performed. A correction coefficient may be determined by being experimentally compared with an electric power generation amount of the real machine. The electric power generation facility 110 is capable of including various variations relevant to the number of electric power generation units 111, and the like. Even in the case of the electric power generation facility 110 having such various variations, basically, the electric power generation capacity can be calculated by the method described above. There may be a difference between the actual electric power generation amount and the calculated electric power generation amount, in accordance with the incident angle of the solar light. In such a case, correction may be suitably performed by using the correction coefficient and the like.

The estimated generation electric power $\theta8$ may be expected to be output by the electric power generation facility 110 at the time of measuring the solar radiation amount $\theta5$ (hereinafter, referred to as a "criterion time"). The estimated generation electric power $\theta8$ may be expected to be output by the electric power generation facility 110 after a predetermined time has elapsed from a time when the solar radiation amount θ5 is measured. The "predetermined time" indicates a time that has elapsed from the criterion time.

The electric power generation panel 114 is easily affected by the weather. For example, in a case where the solar light is blocked by a cloud, the output of the electric power generation panel 114 considerably decreases. The control device 4 generates a control command for absorbing a fluctuation in the output due to a weather change. In number control for preventing the reverse electric power flow, described below, the number command φ2 for increasing and decreasing the number of devices being operated is output with respect to a fluctuation in the lowest purchased electric power that does not generate the reverse electric power flow. In the case of the clear weather, the generation electric power is comparatively stable. However, in actuality, an extremely fast and large repetitive fluctuation occurs in the electric power generation amount. For example, the maximum amount of the fluctuation in the electric power generation amount may fluctuate for a few seconds in a range of greater than or equal to 50% and less than or equal to 70% of electric power generation rating. As a result thereof, there may be many cases where all of the electric power generation units 111 are stopped.

Therefore, a difference between a moving average value of the electric power generation amount of the electric power generation facility 110 and the actual generation electric power θ1 is compensated with the charge and discharge of the electricity storage device 121. As a result thereof, the smoothing of the electric power generation amount can be performed. The object of such control is not to smooth an electric power generation fluctuation but to easily execute control in which the purchased electric power θ7 does not deviate from a contract range. Here, in a case where the electric power generation facility 110 performs the number control, it is not appropriate that the simple moving average value of the actual generation electric power θ1 is set as a reference. As described below in detail, this is because a change in the actual generation electric power θ1 can be affected by not only the weather but also the number control. Therefore, in the electric power management system 1, a calculation method of the moving average value that can be suitably applied to the smoothing of the electric power generation amount in a number control operation is provided. Such calculation is performed by the coefficient unit 12, the correction unit 13, the evaluation unit 14, the evaluation difference unit 15, and the command generation unit 20.

The moving average of the electric power generation amount in the present disclosure is not a moving average of an instantaneous value of the simple electric power generation amount, but a moving average according to the number of electric power generation units 111 being operated. A function for smoothing the generation electric power is a function for compensating an amount corresponding to a change in the electric power generation amount due to a change in a temporary solar irradiation degree with the charge and discharge from the electricity storage device 121. As a result thereof, a fluctuation in the purchased electric power θ7 is suppressed, and thus, a change in the number of devices being operated is suppressed. However, in a case where the number of devices being operated is decreased by the number control, the electric power generation amount also decreases. In the case of compensating such a decrease with the discharge, the purchased electric power θ7 may not be increased by the commensuration for the decrease. As a result thereof, this is contrary to the intended action of the number control. Therefore, the moving average value of the electric power generation amount that is the reference of the smoothing function constantly calculates the influence of the number of devices being operated. As a result thereof, the original number control can be suitably executed. Such a method may be similarly considered in a case where the reverse electric power flow is prevented by not only the number control but also continuous output control.

The coefficient unit 12 receives the number θ2 of panels being operated of the electric power generation panels 114 outputting electric power (being operated) in the electric power generation panels 114, from the electric power generation facility 110. The coefficient unit 12 receives a total number θ9 of all electric power generation panels 114 included in the electric power generation facility 110, from the storage unit 30 of the control device 4. Next, the coefficient unit 12 obtains a correction coefficient θ11 by dividing the total number θ9 by the number θ2 of panels being operated (θ11=θ9/θ2). Then, the coefficient unit 12 outputs the correction coefficient θ11 to the correction unit 13.

The correction unit 13 receives the correction coefficient θ11 from the coefficient unit 12. The correction unit 13 receives the actual generation electric power θ1 from the electric power generation facility 110. The correction unit 13 obtains a corrected generation electric power θ12 by multiplying the actual generation electric power θ1 by the correction coefficient θ11 (θ12=θ1×θ11). Then, the correction unit 13 outputs the corrected generation electric power θ12 to the storage unit 30.

The evaluation unit 14 receives a plurality of corrected generation electric powers θ12 included in a predetermined period, from the storage unit 30. The evaluation unit 14 calculates moving average electric power θ13 as evaluation electric power by using the plurality of corrected generation electric powers θ12. That is, the evaluation unit 14 calculates a moving average of the corrected generation electric power θ12. Then, the evaluation unit 14 outputs the moving average electric power θ13 to the evaluation difference unit 15. The evaluation unit 14 may output a value based on a method that is different from that of the moving average, as an evaluation value. For example, the evaluation unit 14 may output a value obtained by applying a filter (for example, a primary delay filter) to the corrected generation electric power θ12 as an evaluation value. The evaluation unit 14 may output the simple average of the corrected generation electric power θ12 as an evaluation value.

The evaluation difference unit 15 receives the moving average electric power θ13 from the evaluation unit 14. The evaluation difference unit 15 receives the latest corrected generation electric power θ12 from the storage unit 30 or the correction unit 13. The evaluation difference unit 15 obtains an average difference θ14 (an evaluation difference) between the latest corrected generation electric power θ12 and the moving average electric power θ13. Then, the evaluation difference unit 15 outputs the average difference θ14 as processing data to the command generation unit 20. The average difference θ14 may be a value obtained by subtracting the moving average electric power θ13 from the latest corrected generation electric power θ12.

The command generation unit 20 generates the control command φ, on the basis of the data received from the pre-processing unit 10 and the electric power grid connection device 3. The command generation unit 20 outputs the control command φ to the electric power generation facility 110 and the load facility 120. The command generation unit 20 includes a load command unit 21, a number command unit 22, a capacity command unit 23, an electricity storage command unit 24, and an evaluation command unit 25.

<Load Command Unit>

The load command unit 21 generates the load command $\phi 1$ for the load facility 120. The load command unit 21 receives the estimated generation electric power $\theta 8$ from the pre-processing unit 10. The load command unit 21 generates the load command $\phi 1$ as the control command $\phi$, on the basis of the estimated generation electric power $\theta 8$. Then, the load command unit 21 outputs the load command $\phi 1$ to the load facility 120.

According to such load control, the excessive electric power of the electric power generation facility 110 can be minimized. Specifically, the estimated generation electric power $\theta 8$ that can be generated by the electric power generation facility 110 is predicted from the solar radiation amount $\theta 5$. Then, the load facility 120 is operated to be commensurate with the estimated generation electric power $\theta 8$, and thus, the load electric power in the microgrid 100 can be suitably changed. That is, an electric power generation utilization rate can be increased. In other words, the "local consumption" commensurate with the "solar radiation amount $\theta 5$" can be attained. In a case where the "local consumption" increases, the purchased electric power $\theta 7$ also increases. As a result thereof, the number of devices being operated of the electric power generation units 111 commensurate with an increase in the purchased electric power $\theta 7$ increases, and thus, the "local production for local consumption" is attained.

The load command unit 21 calculates the load command $\phi 1$ by using the estimated generation electric power $\theta 8$. The load command $\phi 1$ is request load electric power $\theta 3d$ that is requested as a value to be consumed by the load facility 120. The lowest load at which the reverse electric power flow of the purchased electric power $\theta 7$ is not generated is set as lowest purchased electric power $\theta 7\min$. Then, the request load electric power $\theta 3d$ as the load command $\phi 1$ is calculated by using Expression (1) described below. In Expression (1), the estimated generation electric power $\theta 8$ and the lowest purchased electric power $\theta 7\min$ are a known value. Accordingly, the request load electric power $\theta 3d$ can be determined to satisfy Expression (1) described below. Expression (1) may include the load electric power $\theta 4$ of the consumer 130 as fixed load electric power $\theta 4c$. The consumer 130 does not receive the control command $\phi$, and thus, the fixed load electric power $\theta 4c$ is a fixed value that is assumed.

$$\text{Estimated Generation Electric Power } \theta 8 + \text{Lowest Purchased Electric Power } \theta 7\min = \text{Request Load Electric Power } \theta 3d + \text{Fixed Load Electric Power } \theta 4c \quad (1)$$

Here, an operation that does not allow the reverse electric power flow and an operation that allows the reverse electric power flow may be selected in accordance with a setting value of the lowest purchased electric power $\theta 7\min$. In a case where the reverse electric power flow is not allowed, the lowest purchased electric power $\theta 7\min$ is set to a positive numerical value. At this time, in the case of ignoring the fixed load electric power $\theta 4c$ and of focusing on a magnitude relationship between the estimated generation electric power $\theta 8$ and the request load electric power $\theta 3d$, the following expression is obtained. That is, in other words, in a case where the reverse electric power flow is not allowed, the request load electric power $\theta 3d$ is greater than or equal to the estimated generation electric power $\theta 8$.

$$\text{Estimated Generation Electric Power } \theta 8 \leq \text{Request Load Electric Power } \theta 3d \quad (2)$$

On the other hand, in a case where the reverse electric power flow is allowed, the lowest purchased electric power $\theta 7\min$ is set to a negative numerical value. At this time, in the case of ignoring the fixed load electric power $\theta 4c$ and of focusing on the magnitude relationship between the estimated generation electric power $\theta 8$ and the request load electric power $\theta 3d$, the following expression is obtained. That is, in other words, in a case where the reverse electric power flow is allowed, the request load electric power $\theta 3d$ is less than the estimated generation electric power $\theta 8$.

$$\text{Estimated Generation Electric Power } \theta 8 > \text{Request Load Electric Power } \theta 3d \quad (3)$$

The load command $\phi 1$ may be the request load electric power $\theta 3d$ itself. The load command $\phi 1$ may be a difference from the request load electric power $\theta 3d$ one step before. For example, in a case where the sign of the difference is positive, the load command $\phi 1$ is a command for increasing the load electric power (a load increase command). The load increase command increases the load electric power $\theta 3$ of the load facility 120. The load increase command includes at least one of a command for charging the electricity storage device 121 (a charge command), a command for increasing the production amount of the hydrogen of the hydrogen production device 122 (a hydrogen increase command), and a command for increasing the generation amount of the heat of the heat generation device 123 (a heat increase command). On the contrary, in a case where the sign of the difference is negative, the load command $\phi 1$ is a command for decreasing the load electric power (a load decrease command). The load decrease command decreases the load electric power $\theta 3$ of the load facility 120. The load decrease command includes at least one of a command for discharging the electricity storage device 121 (a discharge command), a command for decreasing the production amount of the hydrogen of the hydrogen production device 122 (a hydrogen decrease command), and a command for decreasing the generation amount of the heat of the heat generation device 123 (a heat decrease command).

In the load control, a basic approach for load distribution is as described below. First, the load facility 120 which is a regenerated energy conversion facility defines the heat generation device 123 and the hydrogen production device 122. The load facility 120 is operated by positive and negative demand/response commands as the load command $\phi 1$. A load that does not receive the positive and negative demands/responses (the load command $\phi 1$) is set to a fixed load. In the estimated generation electric power $\theta 8$, the fixed load is set to the assumed fixed value, and in the load command $\phi 1$ with respect to the load facility 120, the load command $\phi 1$ to the load facility 120 is determined such that the purchased electric power $\theta 7$ to the microgrid 100 from the electric power grid 200 is the lowest load at which the reverse electric power flow is not generated. Not all of the load facilities 120 are constantly in an operation state. For example, in a case where a part of the load facilities 120 is in a stop state, it is added to the load command $\phi 1$ to the load facility 120 being operated. By setting as described above, in a case where the estimated generation electric power $\theta 8$ is high, the load facility 120 can be in a high operation state. As a result thereof, the purchased electric power $\theta 7$ temporarily increases. However, the number of devices being operated is increased by the number control. Accordingly, the "local production for local consumption" of the generation electric power is attained.

The load command unit 21 may output the load command φ1 to the load facility 120 by using the reverse flow electric power θ6 and the reverse electric power flow threshold value. Here, the reverse electric power flow threshold value may be set in accordance with a value (θ1/θ2) obtained by dividing the actual generation electric power θ1 by the number θ2 of electric power generation panels 114 being operated in the electric power generation facility 110. According to such setting, the threshold value is set in accordance with the generation electric power per one electric power generation panel 114. As described above, electric power that is capable of increasing the purchased electric power is determined by stopping only one electric power generation panel 114. As a result thereof, a margin can be cut, and the threshold value can be decreased.

The reverse electric power flow threshold value may be set in accordance with the number of electric power generation units 111 being operated in the electric power generation facility 110. In such a case, in a state where electric power of greater than or equal to 0 kilowatts is constantly purchased from the existing grid, the lower limit value of the reverse electric power flow threshold value may be greater than or equal to 0 kilowatts. Further, in a case where the actual generation electric power θ1 of the electric power generation facility 110 is 0 kilowatts, electric power corresponding to the lowest average load in a grid may be the upper limit.

<Number Command Unit>

The number command unit 22 performs the number control of the electric power generation facility 110. The actual generation electric power θ1 of the electric power generation facility 110 in the number control is controlled by the number of electric power generation units 111 outputting electric power. That is, in the number control, an electric power balance is retained by controlling the number of electric power generation units 111 outputting the electric power.

For example, in a case where the output of the electric power generation facility 110 is set to 100%, the electric power is output from all of the electric power generation units 111. For example, in a case where the output of the electric power generation facility 110 is set to 50%, the electric power is output from half of the electric power generation units 111. That is, in the case of focusing on each of the electric power generation units 111, either the entire electric power is output from the electric power generation unit 111 or no electric power is output from the electric power generation unit 111. In such control, the electromagnetic switch 116 included in the electric power generation unit 111 is used. Accordingly, the number command φ2 that is output by the number command unit 22 includes information relevant to the number of electric power generation units 111 to be operated (to output the electric power). The number command φ2 may be information relevant to the number of electric power generation units 111 not to be operated (not to output the electric power).

The number command unit 22 outputs the number command φ2 for the electric power generation facility 110. The number command unit 22 receives the purchased electric power θ7 from the purchased electric power measurement unit 3c. The number command unit 22 outputs the number command φ2, on the basis of the purchased electric power θ7. Then, the number command unit 22 outputs the number command φ2 to the electromagnetic switch 116 of the electric power generation facility 110. The number command φ2 is provided to the electromagnetic switch 116 of the electric power generation facility 110. For example, the number command φ2 sets a predetermined number of electromagnetic switches 116 to be in an on state, and sets the remaining electromagnetic switches 116 to be in an off state.

Figure 4:
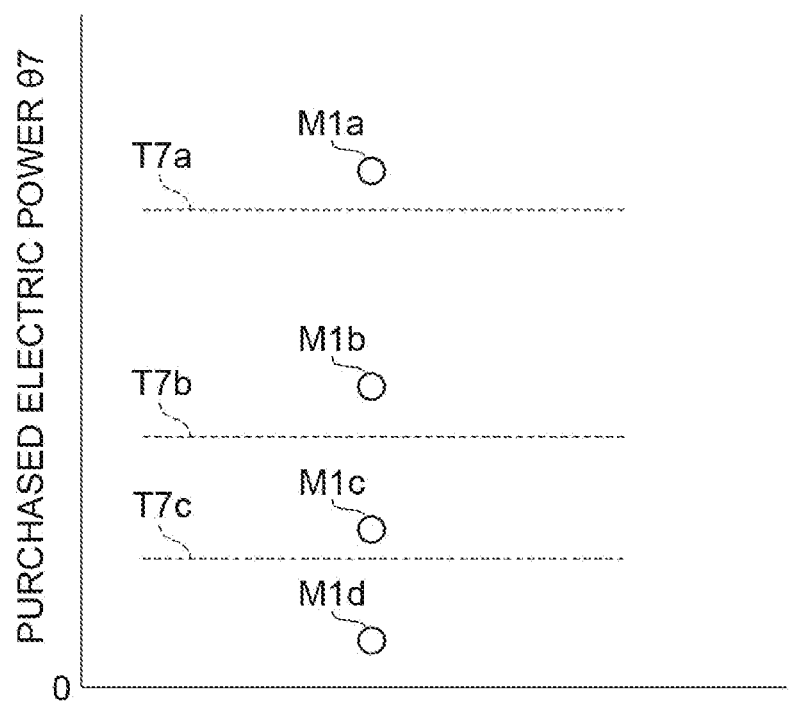
FIG. 4 is a diagram showing a relationship between purchased electric power and a number threshold value in relation to number control.

As shown in FIG. 4, the number command unit 22 compares the purchased electric power θ7 with several number threshold values T7a, T7b, and T7c. When the purchased electric power θ7 is greater than the number threshold value T7a (a marker M1a), the number command unit 22 outputs a command for increasing the number of devices being operated. When the purchased electric power θ7 is less than or equal to the number threshold value T7a and greater than the number threshold value T7b (a marker M1b), the number command unit 22 outputs a command for maintaining the number of devices being operated. When the purchased electric power θ7 is less than or equal to the number threshold value T7b and greater than the number threshold value T7c (a marker M1c), the number command unit 22 outputs the number command φ2 for decreasing the number of devices being operated. Further, when the purchased electric power θ7 is less than or equal to the number threshold value T7c (a marker M1d), the number command unit 22 outputs a command for setting the number of devices being operated to 0.

In conclusion, the number control described above is reverse electric power flow prevention control in the distributed electric power generation facility. The distributed electric power generation facility 110 includes a plurality of small power conditioners 115. The electric power generation facility 110 collects the output of the power conditioner 115 in an alternating-current collection panel. Then, the electric power generation facility 110 supplies the output into the microgrid 100 as alternating-current electric power through a transformer. When the purchased electric power θ7 is less than the number threshold value T7b, a predetermined number of power conditioners 115 being operated are stopped. When the purchased electric power θ7 is sufficiently high (greater than or equal to the number threshold value T7a), the predetermined number of power conditioners 115 being stopped are operated. By such number control, the power conditioners 115 that are automatically stopped are in a standby state after a given length of time has elapsed. The standby state is a state in which a transition to the operation state from the stop state can be performed in accordance with the number command φ2. The number of power conditioners 115 may be several dozen (for example, approximately 40). The number command φ2 is generated such that the number of times of start-and-stop is equal for all of a plurality of power conditioners 115. In a case where the purchased electric power θ7 is extremely low (less than or equal to the number threshold value T7c), the number command φ2 for temporarily stopping all of the power conditioners 115 is output. As a result thereof, the reverse electric power flow can be prevented.

<Capacity Command Unit>

As described above, in the number control, the electric power output from the electric power generation facility 110 corresponds to the number of electric power generation units 111 outputting the electric power (the number of devices being operated). That is, in the number control, the number of devices being operated of the electric power generation units 111 is controlled in order to obtain the balance between the generation electric power and the load electric power in the microgrid 100. In such a case, from the viewpoint of a utilization efficiency of the electric power generation, the utilization efficiency may not be sufficient only by the number control. On the other hand, in the electric power management system 1, from the viewpoint of the utilization efficiency of the electric power generation, "local consumption" commensurate with so-called "local production" is attained by performing the load control described above, and thus, the improvement of the utilization efficiency is ensured. Then, in capacity control, the electric power output from the electric power generation facility 110 corresponds to an output ratio of each of the electric power generation units 111. That is, in the capacity control, the electric power balance is retained by controlling the output ratio of each of the electric power generation units 111.

For example, in a case where the output of the electric power generation facility 110 is set to 100%, the output of all of the electric power generation units 111 is set to 100%. For example, in a case where the output of the electric power generation facility 110 is set to 50%, the output of all of the electric power generation units 111 is set to 50%. In such control, a load suppression function of the power conditioner 115 is used. Accordingly, the capacity command $\phi 3$ that is output by the capacity command unit 23 includes information relevant to the load suppression function of the power conditioner 115.

The capacity command unit 23 generates capacity command $\phi 3$ as the control command $\phi$ for the electric power generation facility 110. The capacity command unit 23 receives the purchased electric power $\theta 7$ from the purchased electric power measurement unit 3c. The capacity command unit 23 generates the capacity command $\phi 3$, on the basis of the purchased electric power $\theta 7$. Then, the capacity command unit 23 outputs the capacity command $\phi 3$ to the power conditioner 115. The capacity command unit 23 outputs the capacity command $\phi 3$ by using the purchased electric power $\theta 7$ and a capacity threshold value T7d which is the lowest setting value of the purchased electric power $\theta 7$.

In a case where the purchased electric power $\theta 7$ is greater than the capacity threshold value T7d, the capacity command unit 23 outputs a command for setting the output of all of the electric power generation units 111 to 100%. A state where the output of the electric power generation unit 111 is 100% has the same meaning as that of setting the power conditioner 115 to the maximum rating value.

In a case where the purchased electric power $\theta 7$ is less than the capacity threshold value T7d, the capacity command unit 23 outputs a command for suppressing the output of all of the electric power generation units 111 to a predetermined value. The output of the electric power generation unit 111 is set to satisfy a requisite for allowing the purchased electric power $\theta 7$ to approach the lowest setting value (the capacity threshold value T7d).

Here, when the output of the electric power generation unit 111 is suppressed, the capacity command unit 23 outputs the capacity command $\phi 3$ in which the output history of the electric power generation facility 110 is as described below. As shown in FIG. 5, in a case where the purchased electric power $\theta 7$ (a graph G5a) is less than the capacity threshold value T7d, the capacity command $\phi 3$ performs an output operation with respect to the electric power generation facility 110 at a first output rate, and then, performs an output operation with respect to the electric power generation facility 110 at a second output rate that is slower than the first output rate. In other words, in a case where the purchased electric power $\theta 7$ is less than the capacity threshold value T7d, the capacity command unit 23, first, changes the actual generation electric power $\theta 1$ (a graph G5b) to second output electric power PP2 from first output electric power PP1 in a first output period PT1. Next, the capacity command unit 23 changes the actual generation electric power $\theta 1$ to the first output electric power PP1 from the second output electric power PP2 in a second output period PT2. Here, the first output period PT1 is shorter than the second output period PT2.

Figure 5A:
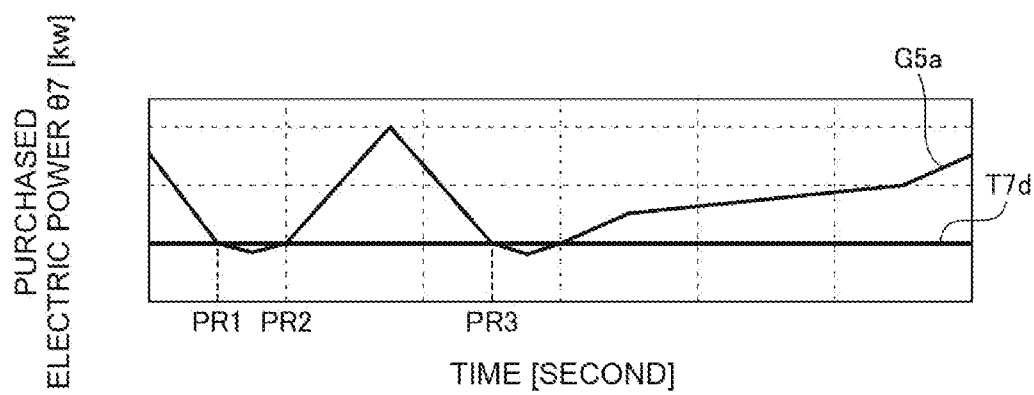
FIG. 5A is a diagram showing a relationship between purchased electric power and a capacity threshold value in relation to capacity control.
Figure 5B:
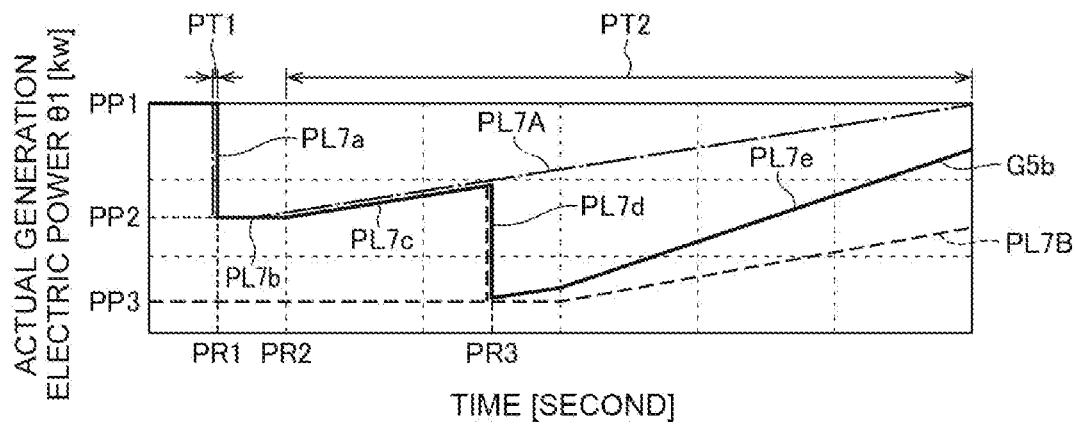
FIG. 5B is a diagram showing actual generation electric power indicated by a capacity command in relation to the capacity control.

Specifically, as shown in FIG. 5A, in a case where the purchased electric power $\theta 7$ is less than the capacity threshold value T7d (a time PR1), the capacity command unit 23 outputs a command (a segment PL7a) for decreasing the output of the electric power generation facility 110 into the shape of a step to the electric power generation facility 110. More specifically, the capacity command unit 23 outputs a command for changing the first output electric power PP1 to the second output electric power PP2 for an extremely short period of time (the first output period PT1) to the electric power generation facility 110. In accordance with such a change, the purchased electric power $\theta 7$ starts to increase. The capacity command unit 23 outputs a command (a segment PL7b) for maintaining the second output electric power PP2 to the electric power generation facility 110. A period in which the second output electric power PP2 is maintained may be set as a predetermined setting period, or may be set as a period until the purchased electric power $\theta 7$ is greater than the capacity threshold value T7d. For example, when the purchased electric power $\theta 7$ is greater than the capacity threshold value T7d (a time PR2), the capacity command unit 23 outputs a command (a segment PL7c) for gradually increasing the actual generation electric power $\theta 1$ of the electric power generation facility 110 to the electric power generation facility 110. An increase ratio of the output to the time (the second output rate) is less than a decrease ratio of the output to the time when the first output electric power PP1 is decreased to the second output electric power PP2 (the first output rate). In other words, the capacity command unit 23 requires the second output period PT2 longer than the first output period PT1, and thus, provides a command for returning the second output electric power PP2 to the first output electric power PP1 to the electric power generation facility 110.

In a period in which the second output electric power PP2 is returned to the first output electric power PP1, the purchased electric power $\theta 7$ can be less than the capacity threshold value T7d again. In such a case, at a time point when the purchased electric power $\theta 7$ is less than the capacity threshold value T7d again (a time PR3), a command (a segment PL7d) for instantaneously decreasing the actual generation electric power $\theta 1$ to third output electric power PP3 is output to the electric power generation facility 110. At this time, a decrease amount of the electric power may be obtained by adding a difference between the first output electric power PP1 and the second output electric power PP2 to the electric power at the current time point. After such a period, a command (a segment PL7e) for adding a graph L7A and a graph L7B is output to the electric power generation facility 110. Each of the graph L7A and the graph L7B indicates a correction discharge command when the capacity threshold value is greater than the lower limit.

<Electricity Storage Command Unit>

The electricity storage command unit 24 generates the electricity storage command $\phi 4$ for the electricity storage device 121. The electricity storage command unit 24 receives the purchased electric power $\theta 7$ from the purchased electric power measurement unit 3c. The electricity storage command unit 24 generates the electricity storage command $\phi 4$, on the basis of the purchased electric power $\theta 7$. Then, the electricity storage command unit 24 outputs the electricity storage command $\phi 4$ to the electricity storage device 121. The electricity storage command unit 24 outputs the electricity storage command φ4 by using the purchased electric power θ7, a charge threshold value T7e, and a discharge threshold value T7f.

A case where the purchased electric power θ7 is small is a case where the actual generation electric power θ1 is large. In the number control and the capacity control described above, in a case where the actual generation electric power θ1 is large, the output of the electric power generation facility 110 is suppressed. The electricity storage command unit 24 retains the electric power balance by charging the electricity storage device 121 with the excessive electric power, without suppressing the output of the electric power generation facility 110.

Figure 6A:
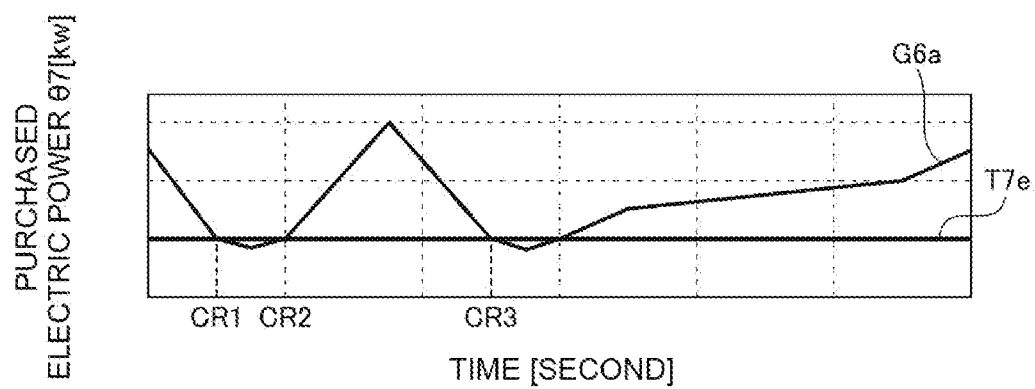
FIG. 6A is a diagram showing a relationship between purchased electric power and a charge threshold value in relation to electricity storage control.
Figure 6B:
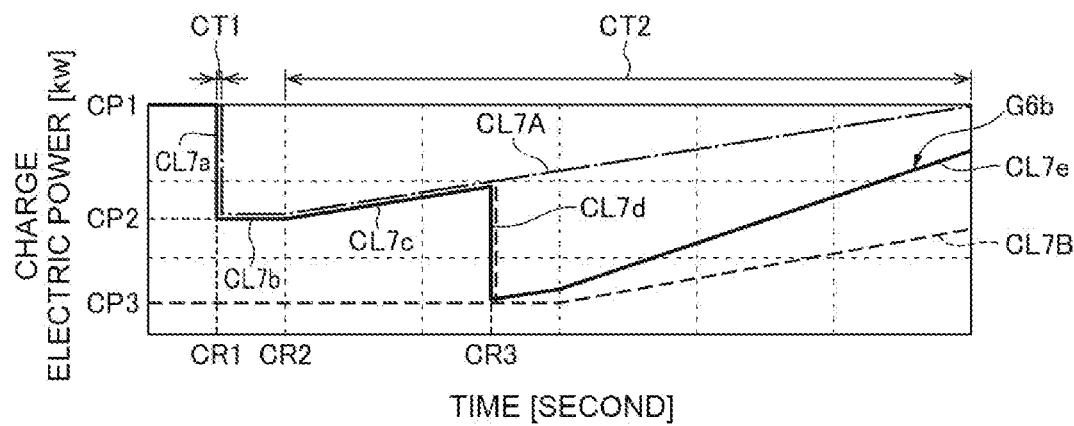
FIG. 6B is a diagram showing charge electric power indicated by a charge command in relation to the electricity storage control.

As shown in FIG. 6, in a case where the purchased electric power θ7 (a graph G6a) is less than the charge threshold value T7e, the electricity storage command unit 24 outputs a command for charging the electricity storage device 121 with the excessive electric power. The charge electric power of the electricity storage device 121 is set to satisfy a requisite for allowing the purchased electric power θ7 to approach the charge threshold value T7e.

Here, when the charge electric power of the electricity storage device 121 is controlled, the electricity storage command unit 24 outputs a first electricity storage command φ4 (a graph G6b) in which the history of the charge electric power of the electricity storage device 121 is as described below. The first electricity storage command φ4 performs a charge operation with respect to the electricity storage device 121 at a first charge rate, and then, performs a charge operation with respect to the electricity storage device 121 at a second charge rate that is slower than the first charge rate. In other words, the electricity storage command unit 24 changes the charge electric power to second charge electric power CP2 from first charge electric power CP1 at a first charge period CT1. Next, the electricity storage command unit 24 changes the charge electric power to the first charge electric power CP1 from the second charge electric power CP2 at a second charge period CT2. Here, the first charge period CT1 is shorter than the second charge period CT2.

Specifically, in a case where the purchased electric power θ7 is less than the charge threshold value T7e (a time CR1), the electricity storage command unit 24 outputs a command (a segment CL7a) for decreasing the charge electric power of the electricity storage device 121 into the shape of a step to the electricity storage device 121. More specifically, the electricity storage command unit 24 outputs a command for changing the first charge electric power CP1 to the second charge electric power CP2 for an extremely short period of time (the first charge period CT1) to the electricity storage device 121. In accordance with such a change, the purchased electric power θ7 starts to increase. The electricity storage command unit 24 outputs a command (a segment CL7b) for maintaining the second charge electric power CP2 to the electricity storage device 121. The electricity storage command unit 24 outputs a command (a segment CL7c) for gradually increasing the charge electric power of the electricity storage device 121 when the purchased electric power θ7 is greater than the charge threshold value T7e (a time CR2) to the electricity storage device 121. An increase ratio (the second charge rate) of the charge electric power to the time is less than a decrease ratio (the first charge rate) of the output to the time when the first charge electric power CP1 is decreased to the second charge electric power CP2. In other words, the electricity storage command unit 24 requires the second charge period CT2 longer than the first charge period CT1, and thus, provides a command for returning the second charge electric power CP2 to the first charge electric power CP1 to the electricity storage device 121.

In a period in which the second charge electric power CP2 is returned to the first charge electric power CP1, the purchased electric power θ7 can be less than the charge threshold value T7e again. In such a case, at a time point when the purchased electric power θ7 is less than the charge threshold value T7e again (a time CR3), a command (a segment CL7d) for instantaneously decreasing the charge electric power to third charge electric power CP3 is output to the electric power generation facility 110. At this time, a decrease amount of the electric power may be obtained by adding a difference between the first charge electric power CP1 and the second charge electric power CP2 to the electric power at the current time point. After such a period, a command (a segment CL7e) for adding a graph CL7A and a graph CL7B is output to the electricity storage device 121.

Figure 7A:
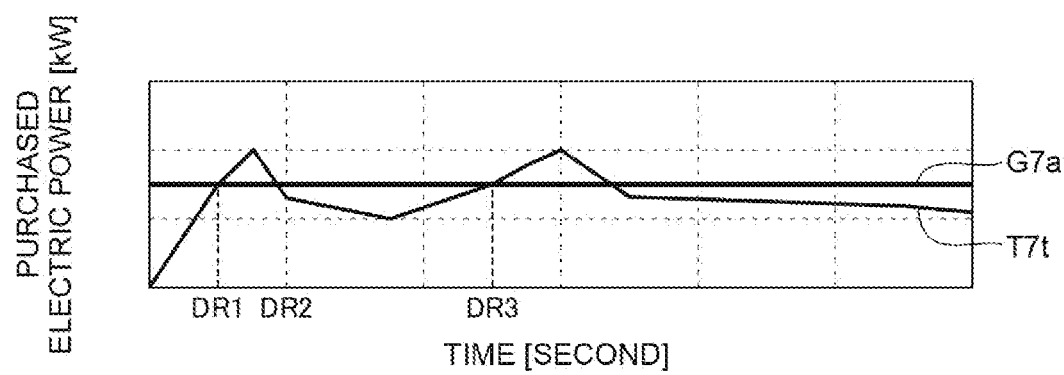
FIG. 7A is a diagram showing a relationship between purchased electric power and a discharge threshold value in relation to electricity storage control.
Figure 7B:
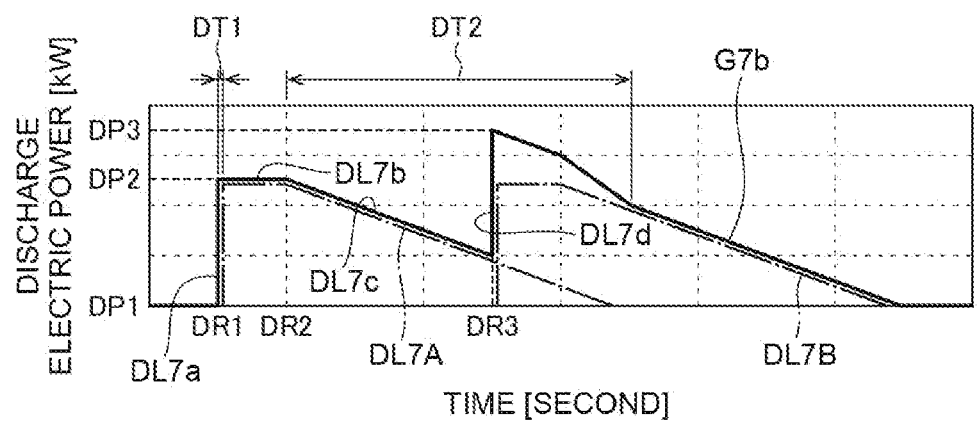
FIG. 7B is a diagram showing discharge electric power indicated by a discharge command in relation to the electricity storage control.

As shown in FIG. 7, in a case where the purchased electric power θ7 (a graph G7a) is greater than the discharge threshold value T7f, the electricity storage command unit 24 outputs a command (a graph G7b) for discharging the electric power stored in the electricity storage device 121 from the electricity storage device 121. The discharge electric power of the electricity storage device 121 is set to satisfy a requisite for allowing the purchased electric power θ7 to approach the discharge threshold value T7f.

Here, when the discharge electric power of the electricity storage device 121 is controlled, the electricity storage command unit 24 outputs a second electricity storage command φ4 in which the history of the discharge electric power of the electricity storage device 121 is as described below. The second electricity storage command φ4 performs a discharge operation with respect to the electricity storage device 121 at a first discharge rate, and then, performs a discharge operation with respect to the electricity storage device 121 at a second discharge rate that is slower than the first discharge rate. In other words, the electricity storage command unit 24 changes the discharge electric power to second discharge electric power DP2 from first discharge electric power DP1 in a first discharge period DT1. Next, the electricity storage command unit 24 changes the discharge electric power to the first discharge electric power DP1 from the second discharge electric power DP2 in a second discharge period DT2. Here, the first discharge period DT1 is shorter than the second discharge period DT2.

Specifically, in a case where the purchased electric power θ7 is greater than the discharge threshold value T7f (a time DR1), the electricity storage command unit 24 increases the discharge electric power of the electricity storage device 121 into the shape of a step. More specifically, the electricity storage command unit 24 outputs a command (a segment DL7a) for changing the first discharge electric power DP1 to the second discharge electric power DP2 for an extremely short period of time (the first output period PT1) to the electricity storage device 121. In accordance with such a change, the purchased electric power θ7 starts to decrease. The electricity storage command unit 24 outputs a command (a segment DL7b) for maintaining the second discharge electric power DP2 to the electricity storage device 121. When the purchased electric power θ7 is less than the discharge threshold value T7f (a time DR2), the electricity storage command unit 24 outputs a command (a segment DL7c) for gradually decreasing the discharge electric power of the electricity storage device 121 to the electricity storage device 121. A decrease ratio of the discharge electric power to the time (the second discharge rate) is less than an increase ratio of the output to the time when the first discharge electric power DP1 is increased to the second discharge electric power DP2 (the first discharge rate). In other words, the electricity storage command unit 24 requires the second discharge period DT2 longer than the first discharge period DT1, and thus, provides a command for returning the second discharge electric power DP2 to the first discharge electric power DP1 to the electricity storage device 121.

In a period in which the second discharge electric power DP2 is returned to the first discharge electric power DP1, the purchased electric power θ7 can be greater than the discharge threshold value T7f again. In such a case, at a time point when the purchased electric power θ7 is greater than the discharge threshold value T7f again (a time DR3), a command (a segment DL7d) for instantaneously increasing the discharge electric power to the third discharge electric power DP3 is output to the electric power generation facility 110. At this time, an increase amount of the electric power may be obtained by adding a difference between the first charge electric power CP1 and the second charge electric power CP2 to the electric power of the current time point. After such a period, a command for adding a graph DL7A and a graph DL7B is output to the electricity storage device 121.

<Evaluation Command Unit>

The evaluation command unit 25 generates the control command ϕ for the electricity storage device 121. The evaluation command unit 25 receives the average difference θ14 from the pre-processing unit 10. The evaluation command unit 25 generates the evaluation command ϕ5, on the basis of the average difference θ14. Then, the evaluation command unit 25 outputs the evaluation command ϕ5 to the electricity storage device 121.

In a case where the average difference θ14 is greater than or equal to 0, the evaluation command unit 25 outputs a command for setting the average difference θ14 to be commensurate with the charge of the electricity storage device 121 to the electricity storage device 121. In a case where the average difference θ14 is less than 0, the evaluation command unit 25 outputs a command for setting the average difference θ14 to be commensurate with the discharge of the electricity storage device 121 to the electricity storage device 121. As a result thereof, the output of the generation electric power of the electric power generation facility 110 approaches the correction moving average, and thus, for example, the electric power of the reverse electric power flow is reliably prevented from being temporarily greater than a predetermined value. In a case where the correction difference is 0, a charge amount of the electricity storage device 121 is 0. That is, in a case where the correction difference is 0, the electricity storage device 121 is not charged and discharged.

<Processing of Control Device>

Figure 8:
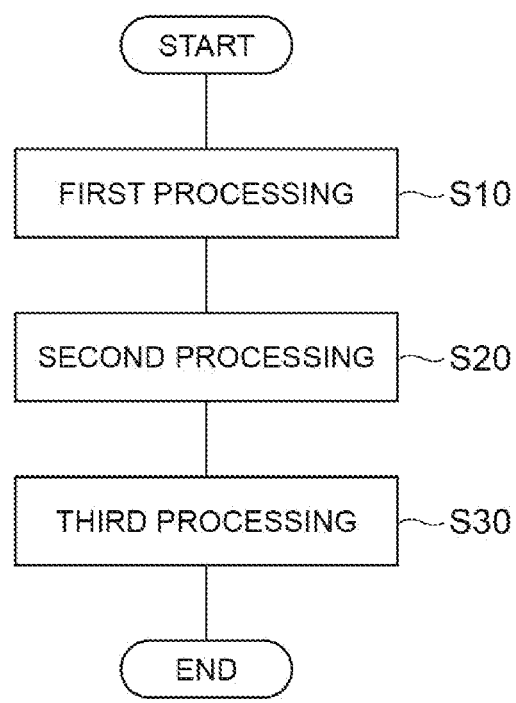
FIG. 8 is a flowchart describing an operation that is implemented by a control device.

Next, the flow of processing that is executed in the control device 4 will be described. As illustrated in FIG. 8, the processing of the control device 4 includes step S10 as first processing, step S20 as second processing, and step S30 as third processing. The first processing outputs the load command ϕ1. The second processing outputs at least one of the number command ϕ2, the capacity command ϕ3, and the electricity storage command ϕ4. The third processing outputs the evaluation command ϕ5.

The processing of the control device 4 may be suitably selected and combined in accordance with an operation mode of the microgrid 100. That is, the control device 4 may perform only the first processing. The control device 4 may perform the first processing and the second processing, or may perform the first processing and the third processing. Further, the control device 4 may perform all of the first processing, the second processing, and the third processing.

<Function Effect>

An electric power generation facility including a solar power generation device of the related art allowed a reverse electric power flow of the total amount of output of the electric power generation facility to an electric power grid, or the electric power generation facility including the solar power generation device of the related art consumed the total amount of output of the electric power generation facility in a microgrid including the electric power generation facility. Recently, the number of electric power generation facilities including a solar power generation device has increased. As a result thereof, grid interconnection and a reverse electric power flow between a new electric power generation facility and an electric power grid become difficult. Further, from the viewpoint of the stabilization of the electric power grid, the electric power generation facility may be enforcedly requested to suppress (entirely block) the output. In such a case, there is no other choice than to set the electric power generation facility of the related art to full electric power generation (100% operation) or to full stop (0% operation).

In contrast, in the electric power management system 1 of the present disclosure, in a case where in the microgrid 100 including a solar power generation facility, the reverse electric power flow is not allowed or a reverse flow electric power amount is suppressed, control is performed such that the generation electric power is effectively used.

Specifically, the electric power management system 1 of the present disclosure adjusts the actual generation electric power θ1 output by the electric power generation facility 110 including the electric power generation unit 111 and the load electric power θ3 consumed by the load facility 120 that is connected to the electric power generation facility 110. The electric power management system 1 includes the solar radiation amount measurement device 2 that is provided adjacent to the electric power generation unit 111 and measures the solar radiation amount θ5 received by the electric power generation unit 111, and the control device 4 that outputs the control command ϕ including a command for the load facility 120. The control device 4 includes the pre-processing unit 10 that outputs information used to generate the control command ϕ, and the command generation unit 20 that outputs the control command ϕ, on the basis of the information output by the pre-processing unit 10. The pre-processing unit 10 includes the prediction unit 11 that outputs electric power expected to be output by the electric power generation facility 110 as the estimated generation electric power θ8, on the basis of the solar radiation amount θ5. The command generation unit 20 includes the load command unit 21 that outputs the load command ϕ1 for increasing and decreasing the load electric power θ3 to the load facility 120, on the basis of the estimated generation electric power θ8.

In other words, the electric power management system 1 of the present disclosure increases a solar light utilization rate by connecting a regenerated energy conversion preservation facility (a regenerated energy conversion facility) to the electric power generation unit 111. In the electric power management system 1, the electricity storage device 121, the hydrogen production device 122, and the heat generation device 123, which are a facility converting electric power that is regenerated energy from the electric power generation unit 111 into another form of energy, are provided in the microgrid 100 including the electric power generation unit 111. Then, the control device 4 of the electric power management system 1 outputs the positive and negative demands/responses (the control command φ) from the solar radiation amount θ5 to the electricity storage device 121, the hydrogen production device 122, and the heat generation device 123, which are the regenerated energy conversion facility. Further, the electric power management system 1 executes output control of the electric power generation unit 111 such that the reverse electric power flow is not generated. According to such configurations and operations, the electric power management system 1 is capable of maintaining a balance between the electric power generation and the consumption. Further, the electric power management system 1 is capable of ensuring the night electric power by effectively utilizing the electricity storage device 121. Therefore, the electric power management system 1 is also capable of smoothing the output electric power in a period in which the output of the electric power generation unit 111 is controlled.

In the electric power management system 1, the prediction unit 11 of the control device 4 outputs the estimated generation electric power θ8 which is electric power expected to be output by the electric power generation facility 110, on the basis of the solar radiation amount θ5 measured by the solar radiation amount measurement device 2. The command generation unit 20 generates the load command φ1 that is provided to the load facility 120, on the basis of the estimated generation electric power θ8. As a result thereof, a balance between the generation electric power of the electric power generation facility 110 and the load electric power θ3 of the load facility 120 can be accurately maintained.

The load command unit 21 of the control device 4 outputs the load command φ1 including a command for setting the load electric power θ3 to be greater than or equal to the estimated generation electric power θ8 to the load facility 120. According to such a configuration, the flow of the electric power to the electric power grid 200 (the reverse electric power flow) can be reliably suppressed. Further, the load command unit 21 of the electric power management system 1 outputs the control command it, including a command for setting the load electric power θ3 to be less than the estimated generation electric power θ8 to the load facility 120. According to such a configuration, the flow of the electric power to the electric power grid 200 can be controlled in a desired manner.

That is, the electric power management system 1 includes a mechanism of preventing the reverse electric power flow and a mechanism of partially allowing the reverse electric power flow. As a result thereof, the generation electric power utilization rate of the electric power generation facility 110 in the microgrid 100 can be maximized. Then, the purchased electric power θ7 from the electric power grid 200 can be suppressed. The electric power management system 1 is capable of easily selecting an operation of allowing the reverse electric power flow and an operation of not allowing the reverse electric power flow by changing the setting value, in accordance with an operation mode. As a result thereof, control for setting the reverse flow electric power to the electric power grid 200 to be less than a certain value can also be easily performed. Accordingly, a freedom degree of a contract in the grid interconnection with respect to the electric power generation facility 110 can be increased.

The reverse electric power flow threshold value in the electric power management system 1 is set in accordance with a value (θ1/θ2) obtained by dividing the actual generation electric power θ1 by the number θ2 of electric power generation panels 114 being operated in the electric power generation facility 110.

The load facility 120 of the electric power management system 1 includes the hydrogen production device 122 that produces hydrogen by using the actual generation electric power θ1, and the heat generation device 123 that generates heat by using the actual generation electric power θ1. The load command φ1 includes at least one of a command for adjusting the production amount of the hydrogen and a command for adjusting the generation amount of the heat. Accordingly, a balance between the actual generation electric power θ1 and the load electric power θ3 can be accurately maintained by increasing and decreasing at least one of the production amount of the hydrogen and the generation amount of the heat.

The electric power management system 1 includes the electric power grid connection device 3 that connects the electric power generation facility 110 and the load facility 120 to the electric power grid 200 and measures the purchased electric power θ7 flowing from the electric power grid 200. The command generation unit 20 includes the number command unit 22 that outputs the number command φ2, on the basis of the purchased electric power θ7. The number command unit 22 outputs the number command φ2 for determining the number of electric power generation units 111 in the operation state to the electric power generation facility 110, on the basis of the purchased electric power θ7. According to such a configuration, the reverse electric power flow to the electric power grid 200 can be reliably suppressed. In conclusion, the electric power management system 1 compares the purchased electric power θ7 with the threshold value, and performs control for suppressing the actual generation electric power θ1 (the number control and the capacity control) in a case where the actual generation electric power θ1 is not capable of being sufficiently received by the load facility 120. As a result thereof, the balance between the electric power generation and the consumption can be constantly maintained.

The pre-processing unit 10 of the electric power management system 1 provides a method for calculating the moving average for the smoothing of the electric power generation facility 110 in the number control of the distributed electric power generation facility 110. That is, in a case where the smoothing of the actual generation electric power θ1 of the electric power generation facility 110 is implemented by using the electricity storage device 121, in the distributed electric power generation facility 110, the pre-processing unit 10 definitely provides the approach of the moving average in the case of implementing the number control. Specifically, the pre-processing unit 10 of the electric power management system 1 includes the coefficient unit 12 that outputs the correction coefficient θ11 obtained by dividing the number of all electric power generation units 111 included in the electric power generation facility 110 by the number of electric power generation units 111 being operates, the correction unit 13 that outputs the corrected generation electric power θ12 obtained by multiplying the actual generation electric power θ1 by the correction coefficient θ11, the evaluation unit 14 that outputs the moving average electric power θ13 which is the moving average value in a predetermined period of the corrected generation electric power θ12, and the evaluation difference unit 15 that outputs the average difference which is a difference between the corrected generation electric power θ12 and the moving average electric power θ13. Accordingly, the corrected generation electric power θ12 can be calculated in consideration of the number of electric power generation units 111 outputting electric power. As a result thereof, the balance between the actual generation electric power θ1 and the load electric power θ3 can be more excellently maintained.

The command generation unit 20 of the electric power management system 1 includes the evaluation command unit 25 that outputs the evaluation command φ5, on the basis of the average difference. The evaluation command unit 25 outputs the charge command for charging the electricity storage device 121 to the electricity storage device 121 in a case where the average difference θ14 indicates that the corrected generation electric power θ12 is greater than the moving average electric power θ13, or outputs the discharge command for discharging the electricity storage device 121 to the electricity storage device 121 in a case where the average difference θ14 indicates that the corrected generation electric power θ12 is less than the moving average electric power θ13. Accordingly, the smoothing of the actual generation electric power θ1 can be attained by the charge and discharge of the electricity storage device 121. Accordingly, the balance between the actual generation electric power θ1 and the load electric power θ3 can be reliably maintained.

In the number control of the electric power generation facility 110, the electric power management system 1 suppresses a number change due to the charge and discharge of the electricity storage device 121 by using a charge and discharge correction command corresponding to the upper limit and the lower limit of the purchased electric power θ7. Specifically, the electric power management system 1 includes the electric power grid connection device 3 that connects the electric power generation facility 110 and the load facility 120 to the electric power grid 200 and measures the purchased electric power θ7 flowing from the electric power grid 200. The command generation unit 20 includes the electricity storage command unit 24 that outputs the electricity storage command φ4, on the basis of the purchased electric power θ7. The electricity storage command unit 24 outputs the first electricity storage command to the electricity storage device 121 in a case where the purchased electric power θ7 is less than the charge threshold value. Alternatively, the command unit 24 outputs the second electricity storage command to the electricity storage device 121 in a case where the purchased electric power θ7 is greater than the discharge threshold value. The first electricity storage command is a command for performing the charge operation with respect to the electricity storage device 121 at the first charge rate, and then, for performing the charge operation with respect to the electricity storage device 121 at the second charge rate that is slower than the first charge rate. The second electricity storage command is a command for performing the discharge operation with respect to the electricity storage device 121 at the first discharge rate, and then, for performing the discharge operation with respect to the electricity storage device 121 at the second discharge rate that is slower than the first discharge rate. According to such a configuration, the purchased electric power θ7 can be suitably controlled.

The electric power management system 1 includes the electric power grid connection device 3 that connects the electric power generation facility 110 and the load facility 120 to the electric power grid 200 and measures the purchased electric power θ7 flowing from the electric power grid 200. The command generation unit 20 includes the capacity command unit 23 that outputs the capacity command φ3, on the basis of the purchased electric power θ7. The capacity command unit 23 is a command for performing the output operation with respect to the electric power generation facility 110 at the first output rate, and then, for performing the output operation with respect to the electric power generation facility 110 at the second output rate that is slower than the first output rate in a case where the purchased electric power θ7 is less than the capacity threshold value. Also, according to such a configuration, the purchased electric power θ7 can also be suitably controlled.

The electric power management system 1 performs control for setting the upper limit of the actual generation electric power θ1. That is, the electric power management system 1 performs control for preventing the reverse electric power flow (output upper limit continuous control of the power conditioner 115). Specifically, in a case where the purchased electric power θ7 is greater than the capacity threshold value, the capacity command unit 23 of the electric power management system 1 outputs the capacity command φ3 including a command for outputting the entire electric power generated by the electric power generation unit 111 as the actual generation electric power θ1 to the electric power generation facility 110. Accordingly, the actual generation electric power θ1 of the electric power generation facility 110 can be maximized without frequently re-operating the electric power generation unit 111 of the electric power generation facility 110.

The electric power management system of the present disclosure is also capable of including the following aspects.

Examples of the power source included in the microgrid include a solar power generation facility. A solar power generation device is easily affected by the ambient environment such as the weather. That is, the generation electric power may be increased and decreased due to the influence of the ambient environment. In such a situation, it is also required to maintain the balance between the generation electric power and the load electric power by the smoothing of the generation electric power.

An electric power management system is an electric power management system for adjusting actual generation electric power output by an electric power generation facility including a solar power generation device, and load electric power consumed by a load facility that is connected to the electric power generation facility, the system including: a control device that outputs a control command including a command for the load facility; and an electric power grid connection device that connects the electric power generation facility and the load facility to an electric power grid and measures purchased electric power flowing from the electric power grid, in which the control device includes a pre-processing unit that outputs information used to generate the control command, and a command generation unit that outputs the control command, on the basis of the information output by the pre-processing unit, the command generation unit includes a number command unit that outputs the control command, on the basis of the purchased electric power, and the number command unit outputs the control command including a command for determining the number of solar power generation devices in an operation state to the electric power generation facility, on the basis of the purchased electric power.

According to such a configuration, the reverse electric power flow to the electric power grid can be reliably suppressed, and thus, the balance between the generation electric power and the load electric power can be managed in a desired manner.

The command generation unit includes a capacity command unit that outputs the control command, on the basis of the purchased electric power, and the capacity command unit outputs the control command including a command for outputting the entire electric power generated by the solar power generation device as the actual generation electric power to the electric power generation facility in a case where the purchased electric power is greater than a capacity threshold value.

Accordingly, the actual generation electric power of the electric power generation facility can be maximized without frequently re-operating the solar power generation device of the electric power generation facility.

The capacity command unit outputs the control command including a command for performing an output operation with respect to the electric power generation facility at a first output rate, and then, for performing an output operation with respect to the electric power generation facility at a second output rate that is slower than the first output rate to the electric power generation facility in a case where the purchased electric power is less than the capacity threshold value.

According to such a configuration, the purchased electric power can be suitably controlled.

The processing of the control device may be suitably selected and combined in accordance with an operation mode of the microgrid. That is, the control device may perform only the second processing described above. The control device may perform the first processing and the second processing described above, or may perform the second processing and the third processing described above. Further, the control device may perform all of the first processing, the second processing, and the third processing.

Examples of the power source included in the microgrid include a solar power generation facility. A solar power generation device is easily affected by the ambient environment such as the weather. That is, the generation electric power may be increased and decreased due to the influence of the ambient environment. In such a situation, in order to set the purchased electric power from the outside to be in a predetermined range, the balance between the generation electric power and the load electric power is required to be maintained by rapidly responding to a fluctuation in the generation electric power.

An electric power management system is an electric power management system adjusting actual generation electric power output by an electric power generation facility including a solar power generation device, and load electric power consumed by a load facility that is connected to the electric power generation facility and includes an electricity storage device, the system including: a control device that outputs a control command including a command for the load facility; and an electric power grid connection device that connects the electric power generation facility and the load facility to an electric power grid and measures purchased electric power flowing from the electric power grid, in which the control device includes a pre-processing unit that outputs information used to generate the control command, and a command generation unit that outputs the control command, on the basis of the information output by the pre-processing unit, the command generation unit includes an electricity storage command unit that outputs the control command, on the basis of the purchased electric power, the electricity storage command unit outputs a first electricity storage command to the electricity storage device in a case where the purchased electric power is less than a charge threshold value or outputs a second electricity storage command to the electricity storage device in a case where the purchased electric power is greater than a discharge threshold value, the first electricity storage command is a command for performing a charge operation with respect to the electricity storage device at a first charge rate, and then, for performing a charge operation with respect to the electricity storage device at a second charge rate that is slower than the first charge rate, and the second electricity storage command is a command for performing a discharge operation with respect to the electricity storage device at a first discharge rate, and then, for performing a discharge operation with respect to the electricity storage device at a second discharge rate that is slower than the first discharge rate.

According to such a configuration, the electricity storage device is controlled on the basis of the purchased electric power, the charge threshold value, and the discharge threshold value. As a result thereof, it is possible to rapidly respond to a change in an electric power balance between the electric power generation facility and the load facility. Accordingly, a balance between the generation electric power and the load electric power can be managed in a desired manner.

The processing of the control device may be suitably selected and combined in accordance with an operation mode of the microgrid. That is, the control device may perform only the second processing described above. The control device may perform the first processing and the second processing described above, or may perform the second processing and the third processing described above. Further, the control device may perform all of the first processing, the second processing, and the third processing.

Examples of the power source included in the microgrid include a solar power generation facility. A solar power generation device is easily affected by the ambient environment such as the weather. That is, the generation electric power may be increased and decreased due to the influence of the ambient environment. In such a situation, it is required to maintain the balance between the generation electric power and the load electric power by suppressing the influence of a fluctuation in the generation electric power by the smoothing of the generation electric power.

An electric power management system is an electric power management system adjusting actual generation electric power output by an electric power generation facility including a solar power generation device, and load electric power consumed by a load facility that is connected to the electric power generation facility, the system including: a control device that outputs a control command including a command for the load facility, in which the control device includes a pre-processing unit that outputs information used to generate the control command, and a command generation unit that outputs the control command, on the basis of the information output by the pre-processing unit, the pre-processing unit includes a coefficient unit that outputs a coefficient obtained by dividing the number of all solar power generation devices included in the electric power generation facility by the number of solar power generation devices being operated, a correction unit that outputs corrected generation electric power which is the actual generation electric power corrected by multiplying the actual generation electric power by the coefficient, an evaluation unit that outputs evaluation electric power for evaluating the corrected generation electric power in a predetermined period, and an evaluation difference unit that outputs an evaluation difference which is a difference between the corrected generation electric power and the evaluation electric power.

According to such a configuration, the evaluation difference can be obtained at the time of switching the number of devices. Accordingly, control can be performed in consideration of only a change in a solar radiation amount, and thus, smoothing can be performed with a higher accuracy. As a result thereof, a balance between the generation electric power and the load electric power can be managed in a desired manner.

The evaluation electric power is a moving average value of the corrected generation electric power in the predetermined period.

The load facility includes an electricity storage device, the command generation unit includes an evaluation command unit that outputs the control command, on the basis of the evaluation difference, and the evaluation command unit outputs the control command including a command for charging the electricity storage device to the electricity storage device in a case where the evaluation difference indicates that the corrected generation electric power is greater than the evaluation electric power, or outputs the control command including a command for discharging the electricity storage device to the electricity storage device in a case where the evaluation difference indicates that the corrected generation electric power is less than the evaluation electric power.

Also, according to such a configuration, the balance between the generation electric power and the load electric power can also be managed in a desired manner.

The processing of the control device may be suitably selected and combined in accordance with an operation mode of the microgrid. That is, the control device may perform only the third processing described above. The control device may perform the first processing and the third processing described above, or may perform the second processing and the third processing described above. Further, the control device may perform all of the first processing, the second processing, and the third processing.

REFERENCE SIGNS LIST

1: electric power management system, 2: solar radiation amount measurement device, 3: electric power grid connection device, 4: control device, 10: pre-processing unit, 11: prediction unit, 12: coefficient unit, 13: correction unit, 14: evaluation unit, 15: evaluation difference unit, 20: command generation unit, 21: load command unit, 22: number command unit, 23: capacity command unit, 24: electricity storage command unit, 25: evaluation command unit, 110: electric power generation facility, 111: electric power generation unit (solar power generation device), 120: load facility, 121: electricity storage device, 122: hydrogen production device, 123: heat generation device, 200: electric power grid, T7e: charge threshold value, T7f: discharge threshold value, θ1: actual generation electric power, θ3, θ4: load electric power, θ5: solar radiation amount, θ7: purchased electric power, θ8: estimated generation electric power, θ12: corrected generation electric power, θ13: moving average electric power, θ14: average difference, φ: control command.

The invention claimed is:

1. An electric power management system adjusting actual generation electric power output by an electric power generation facility including a solar power generation device, and load electric power consumed by a load facility that is connected to the electric power generation facility, the electric power management system comprising:
 a solar radiation amount measurement device that is provided adjacent to the solar power generation device and measures a solar radiation amount received by the solar power generation device; and
 a control device that outputs a control command including a command for the load facility,
 wherein the control device includes
 a pre-processing unit that outputs information used to generate the control command, and
 a command generation unit that outputs the control command, on the basis of the information output by the pre-processing unit,
 the pre-processing unit includes a prediction unit that outputs electric power expected to be output by the electric power generation facility as estimated generation electric power, on the basis of the solar radiation amount, and
 the command generation unit includes a load command unit that outputs the control command including a command for increasing and decreasing the load electric power to the load facility, on the basis of the estimated generation electric power, and
 an electric power grid connection device that connects the electric power generation facility and the load facility to an electric power grid and measures reverse flow electric power flowing to the electric power grid,
 wherein the load command unit outputs the control command, on the basis of the reverse flow electric power and a reverse electric power flow threshold value, and
 wherein the reverse electric power flow threshold value is set in accordance with a value obtained by dividing the actual generation electric power by the number of solar power generation devices being operated in the electric power generation facility.

2. The electric power management system according to claim 1,
 wherein the load command unit outputs the control command including a command for setting the load electric power to be greater than or equal to the estimated generation electric power to the load facility.

3. The electric power management system according to claim 1,
 wherein the load command unit outputs the control command including a command for setting the load electric power to be less than the estimated generation electric power to the load facility.

4. The electric power management system according to claim 1,
 wherein the load facility includes at least one of a hydrogen production device that produces hydrogen by using the actual generation electric power and a heat generation device that generates heat by using the actual generation electric power, and
 the control command includes at least one of a command for adjusting a production amount of the hydrogen and a command for adjusting a generation amount of the heat.

5. The electric power management system according to claim 1, comprising:
 an electric power grid connection device that connects the electric power generation facility and the load facility to an electric power grid and measures purchased electric power flowing from the electric power grid,
 wherein the command generation unit includes a number command unit that outputs the control command, on the basis of the purchased electric power, and
 the number command unit outputs the control command including a command for determining the number of solar power generation devices in an operation state to the electric power generation facility, on the basis of the purchased electric power.

6. The electric power management system according to claim 1,
wherein the pre-processing unit includes
a coefficient unit that outputs a coefficient which is a value obtained by dividing the number of all solar power generation devices included in the electric power generation facility by the number of solar power generation devices being operated,
a correction unit that outputs corrected generation electric power which is the actual generation electric power corrected by multiplying the actual generation electric power by the coefficient,
an evaluation unit that outputs evaluation electric power for evaluating the corrected generation electric power in a predetermined period, and
an evaluation difference unit that outputs an evaluation difference which is a difference between the corrected generation electric power and the evaluation electric power.

7. The electric power management system according to claim 6,
wherein the evaluation electric power is a moving average value of the corrected generation electric power in the predetermined period.

8. The electric power management system according to claim 6,
wherein the load facility includes an electricity storage device,
the command generation unit includes an evaluation command unit that outputs the control command, on the basis of the evaluation difference, and
the evaluation command unit outputs the control command including a command for charging the electricity storage device to the electricity storage device in a case where the evaluation difference indicates that the corrected generation electric power is greater than the evaluation electric power, or outputs the control command including a command for discharging the electricity storage device to the electricity storage device in a case where the evaluation difference indicates that the corrected generation electric power is less than the evaluation electric power.

9. The electric power management system according to claim 1,
wherein the load facility includes an electricity storage device,
the electric power management system comprises an electric power grid connection device that connects the electric power generation facility and the load facility to an electric power grid and measures purchased electric power flowing from the electric power grid,
the command generation unit includes an electricity storage command unit that outputs the control command, on the basis of the purchased electric power,
the electricity storage command unit outputs a first electricity storage command to the electricity storage device in a case where the purchased electric power is less than a charge threshold value, or outputs a second electricity storage command to the electricity storage device in a case where the purchased electric power is greater than a discharge threshold value,
the first electricity storage command is a command for performing a charge operation with respect to the electricity storage device at a first charge rate, and then, for performing a charge operation with respect to the electricity storage device at a second charge rate that is slower than the first charge rate, and the second electricity storage command is a command for performing a discharge operation with respect to the electricity storage device at a first discharge rate, and then, for performing a discharge operation with respect to the electricity storage device at a second discharge rate that is slower than the first discharge rate.

10. The electric power management system according to claim 1, comprising:
an electric power grid connection device that connects the electric power generation facility and the load facility to an electric power grid and measures purchased electric power flowing from the electric power grid,
wherein the command generation unit includes a capacity command unit that outputs the control command, on the basis of the purchased electric power, and
the capacity command unit outputs the control command including a command for performing an output operation with respect to the electric power generation facility at a first output rate, and then, for performing an output operation with respect to the electric power generation facility at a second output rate that is slower than the first output rate to the electric power generation facility in a case where the purchased electric power is less than a capacity threshold value.

11. The electric power management system according to claim 10,
wherein the capacity command unit outputs the control command including a command for outputting the entire electric power generated by the solar power generation device as the actual generation electric power to the electric power generation facility in a case where the purchased electric power is greater than the capacity threshold value.

12. An electric power management system adjusting actual generation electric power output by an electric power generation facility including a solar power generation device, and load electric power consumed by a load facility that is connected to the electric power generation facility, the electric power management system comprising:
a solar radiation amount measurement device that is provided adjacent to the solar power generation device and measures a solar radiation amount received by the solar power generation device; and
a control device that outputs a control command including a command for the load facility,
wherein the control device includes
a pre-processing unit that outputs information used to generate the control command, and
a command generation unit that outputs the control command, on the basis of the information output by the pre-processing unit,
the pre-processing unit includes a prediction unit that outputs electric power expected to be output by the electric power generation facility as estimated generation electric power, on the basis of the solar radiation amount, and
the command generation unit includes a load command unit that outputs the control command including a command for increasing and decreasing the load electric power to the load facility, on the basis of the estimated generation electric power,
wherein the load facility includes an electricity storage device,
the electric power management system comprises an electric power grid connection device that connects the electric power generation facility and the load facility to an electric power grid and measures purchased electric power flowing from the electric power grid, the command generation unit includes an electricity storage command unit that outputs the control command, on the basis of the purchased electric power, the electricity storage command unit outputs a first electricity storage command to the electricity storage device in a case where the purchased electric power is less than a charge threshold value, or outputs a second electricity storage command to the electricity storage device in a case where the purchased electric power is greater than a discharge threshold value, the first electricity storage command is a command for performing a charge operation with respect to the electricity storage device at a first charge rate, and then, for performing a charge operation with respect to the electricity storage device at a second charge rate that is slower than the first charge rate, and the second electricity storage command is a command for performing a discharge operation with respect to the electricity storage device at a first discharge rate, and then, for performing a discharge operation with respect to the electricity storage device at a second discharge rate that is slower than the first discharge rate.

* * * * *